United States Patent
Gelman et al.

(10) Patent No.: US 10,996,814 B2
(45) Date of Patent: May 4, 2021

(54) TACTILE FEEDBACK IN A DISPLAY SYSTEM

(71) Applicant: Real View Imaging Ltd., Yokneam (IL)

(72) Inventors: Shaul Alexander Gelman, Raanana (IL); Aviad Kaufman, Zikhron-Yaakov (IL); Carmel Rotschild, Ganei-Tikva (IL)

(73) Assignee: Real View Imaging Ltd., Yokneam (IL)

( * ) Notice: Subject to any disclaimer, the term of this patent is extended or adjusted under 35 U.S.C. 154(b) by 19 days.

(21) Appl. No.: 16/464,691

(22) PCT Filed: Nov. 29, 2017

(86) PCT No.: PCT/IL2017/051298
§ 371 (c)(1),
(2) Date: May 29, 2019

(87) PCT Pub. No.: WO2018/100575
PCT Pub. Date: Jun. 7, 2018

(65) Prior Publication Data
US 2020/0301563 A1    Sep. 24, 2020

Related U.S. Application Data

(60) Provisional application No. 62/427,259, filed on Nov. 29, 2016.

(51) Int. Cl.
*G06F 3/048* (2013.01)
*G06F 3/0481* (2013.01)
(Continued)

(52) U.S. Cl.
CPC ..... *G06F 3/04815* (2013.01); *G02B 27/0172* (2013.01); *G06F 3/014* (2013.01);
(Continued)

(58) Field of Classification Search
CPC ....... G06F 3/04815; G06F 3/014; G06F 3/016
See application file for complete search history.

(56) References Cited

U.S. PATENT DOCUMENTS

2011/0102570 A1  5/2011  Wilf et al.
2012/0113223 A1*  5/2012  Hilliges .................... G06F 3/00
348/46
(Continued)

FOREIGN PATENT DOCUMENTS

WO   WO 2011/045789   4/2011
WO   WO 2012/093394   7/2012
(Continued)

OTHER PUBLICATIONS

International Preliminary Report on Patentability dated Jun. 13, 2019 From the International Bureau of WIPO Re. Application No. PCT/IL2017/051298. (7 Pages).
(Continued)

*Primary Examiner* — David E Choi

(57) ABSTRACT

A method for providing tactile feedback in a display system including using a display to show an image of a virtual object in a viewing space, using a touch detector to detect a user touching a real object within the viewing space, and providing a location of the touching to the display. Related apparatus and methods are also described.

24 Claims, 18 Drawing Sheets

(51) Int. Cl.
*G02B 27/01* (2006.01)
*G06F 3/01* (2006.01)
*G06K 9/00* (2006.01)

(52) U.S. Cl.
CPC ............. *G06F 3/016* (2013.01); *G06F 3/017* (2013.01); *G06K 9/00671* (2013.01); *G02B 2027/0134* (2013.01); *G02B 2027/0138* (2013.01); *G02B 2027/0174* (2013.01)

(56) References Cited

U.S. PATENT DOCUMENTS

| | | | |
|---|---|---|---|
| 2013/0249942 A1* | 9/2013 | Green | G06F 3/14 345/633 |
| 2014/0240225 A1 | 8/2014 | Eilat | |
| 2015/0199022 A1 | 7/2015 | Gottesman et al. | |
| 2015/0227203 A1 | 8/2015 | Chen et al. | |
| 2018/0068577 A1* | 3/2018 | Javanbakht | H04N 7/152 |

FOREIGN PATENT DOCUMENTS

| | | |
|---|---|---|
| WO | WO 2012/164562 | 12/2012 |
| WO | WO 2013/093906 | 6/2013 |
| WO | WO 2013/190538 | 12/2013 |
| WO | WO 2014/111947 | 7/2014 |
| WO | WO 2015/011703 | 1/2015 |
| WO | WO 2015/091638 | 6/2015 |
| WO | WO 2016/076951 | 5/2016 |
| WO | WO 2016/130860 | 8/2016 |
| WO | WO 2018/100575 | 6/2018 |

OTHER PUBLICATIONS

International Search Report and the Written Opinion dated Feb. 25, 2018 From the International Searching Authority Re. Application No. PCT/IL2017/051298. (10 Pages).

* cited by examiner

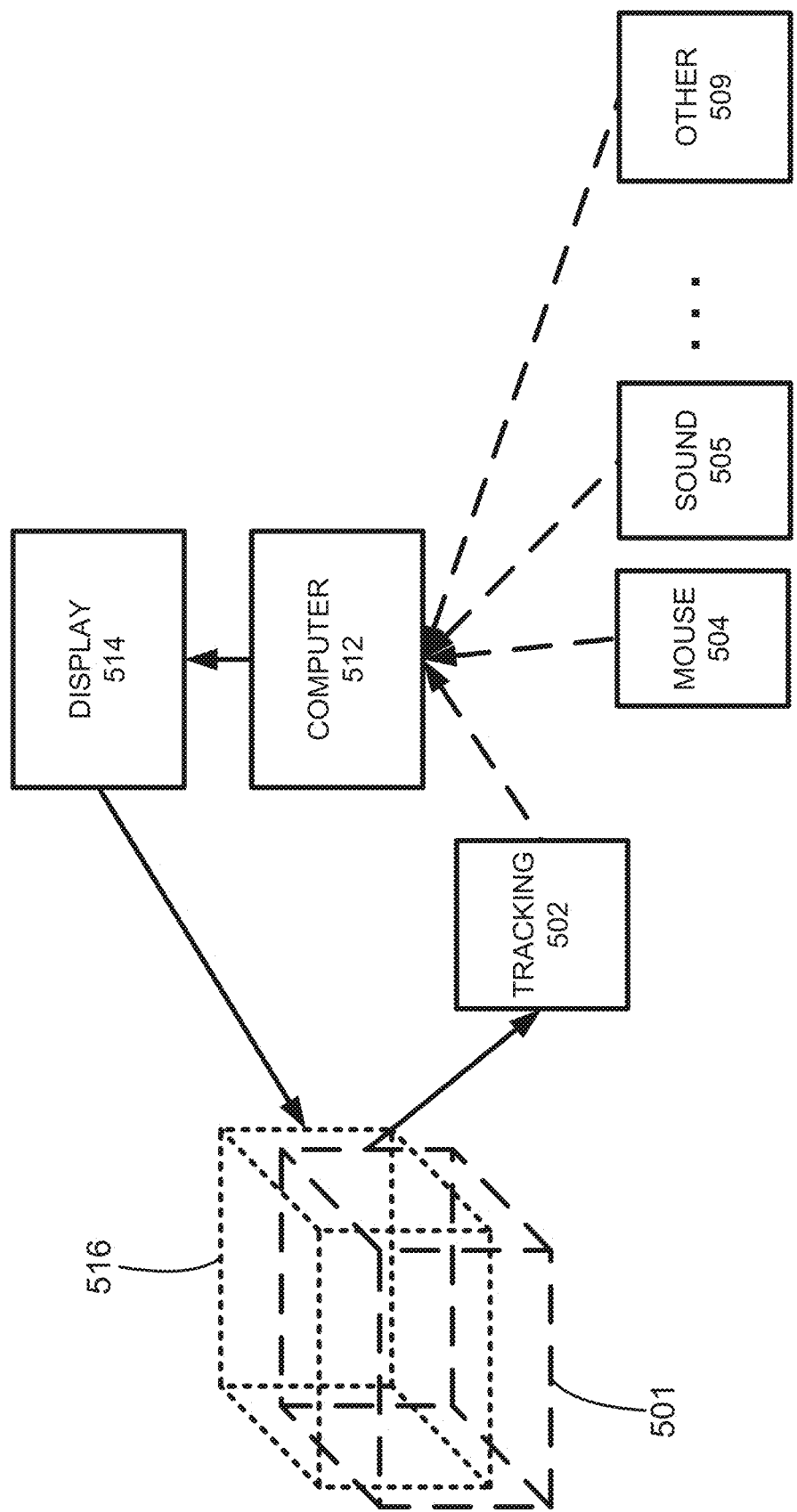

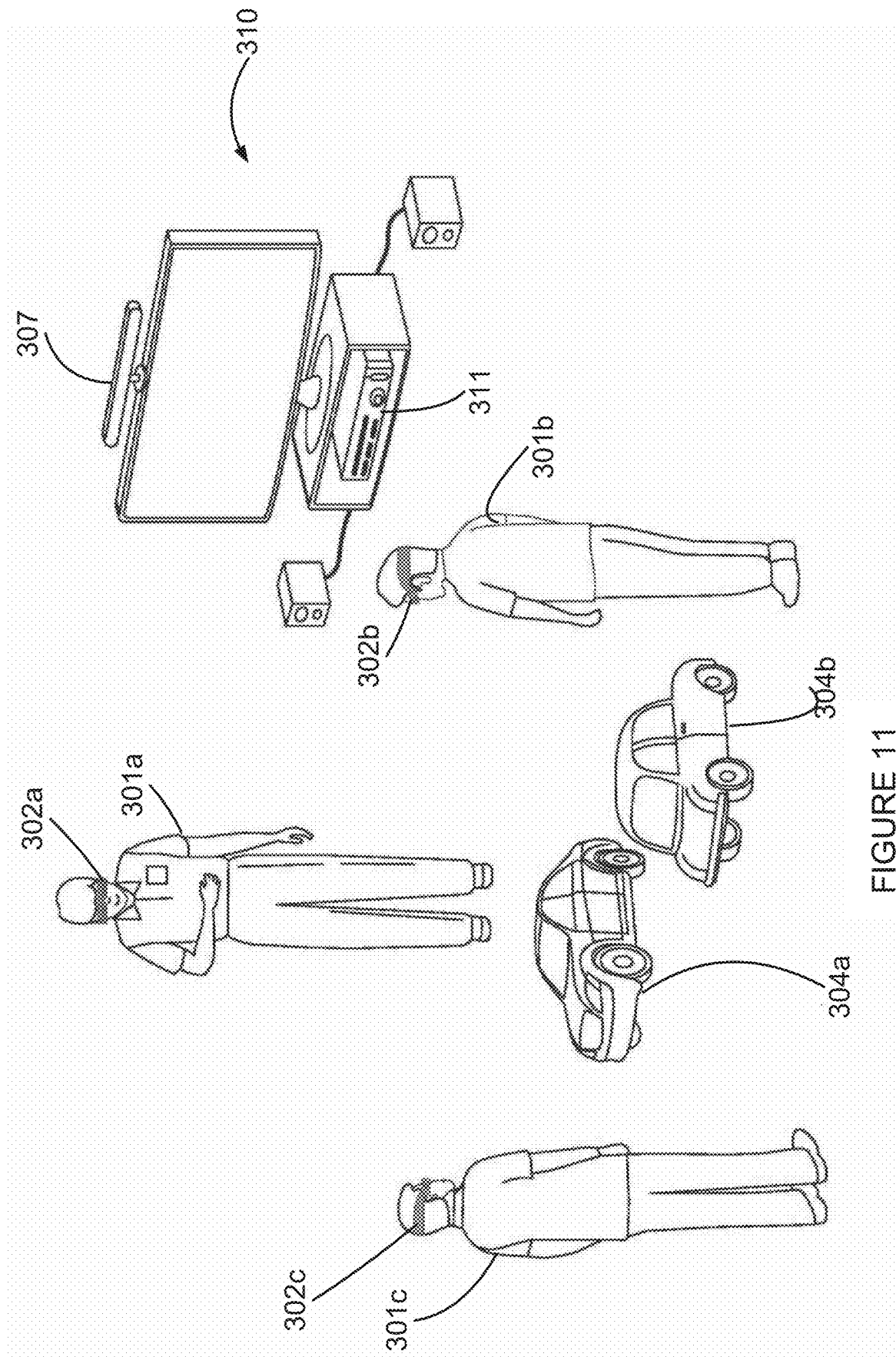

TACTILE FEEDBACK IN A DISPLAY SYSTEM

RELATED APPLICATIONS

This application is a National Phase of PCT Patent Application No. PCT/IL2017/051298 having International filing date of Nov. 29, 2017, which claims the benefit of priority under 35 USC § 119(e) of U.S. Provisional Patent Application No. 62/427,259 filed on Nov. 29 2016. The contents of the above applications are all incorporated by reference as if fully set forth herein in their entirety.

FIELD AND BACKGROUND OF THE INVENTION

The present invention, in some embodiments thereof, relates to a method and a system for providing tactile feedback in a floating-in-the-air display system, and, more particularly, but not exclusively to tactile feedback in a virtual reality or augmented reality display system, and, even more particularly, but not exclusively to tactile feedback in a virtual reality or augmented reality user interface, or mixed reality user interface or other computer generated or modified realities.

The disclosures of all references mentioned throughout the present specification, as well as the disclosures of all references mentioned in those references, are hereby incorporated herein by reference.

SUMMARY OF THE INVENTION

An aspect of some embodiments of the invention involves providing tactile feedback in a floating-in-the-air display system.

In some embodiments, the floating-in-the-air display system is a three-dimensional floating-in-the-air display system.

In some embodiments, the floating-in-the-air display system allows a user to reach into a same space or volume where an image appears to be. Some non-limiting examples of such displays include some holographic displays, and some stereoscopic displays.

In some embodiments, the floating-in-the-air display system is a holographic display, which visual depth cues to human perception including eye convergence and eye accommodation.

In some embodiments, the tactile feedback is matched to the visual depth cues including eye convergence and eye accommodation.

By way of a non-limiting example, a user viewing an image of a virtual object, for example by using a head mounted display, reaches his hand to touch the virtual object. In many cases there is no physical object where the user sees the virtual object. In other cases there may be a real object there, but not the virtual object being shown.

The user optionally touches a first finger to the virtual object, and also brings a second finger to touch his first finger. The second finger touching the first finger provides a sense of touch, or tactile feedback.

In some embodiments, an object detection system viewing the space in which the virtual object is shown detects when the fingers touch each other, and optionally provides input reporting the touch to a computer controlling the display system. The computer controlling the display system may, at this stage, show the virtual object as if it is actually touched or even grasped by the user. By way of a non-limiting example, the computer optionally controls a showing of the virtual object in a manner similar to the user actually manipulating a real instance of the virtual object.

Some aspects of some embodiments of the invention involve fusing a user's sense of touch with the user's viewing of a virtual object into a fused sight-and-touch experience. In some embodiments the image of the virtual object provides all depth cues including eye accommodation, eye convergence and provides the visual depth cues at the same depth as the touch sense is provided, without confusion.

Some aspects of some embodiments of the invention involve providing a user interface which provides a tactile sense fused together with a visual experience in a floating-in-the-air display system.

In some embodiments, an object detection system viewing the space in which an image of the virtual object is shown detects a real object in the space, and optionally detects when the user touches the real object.

In some embodiments, a computer controlling the floating-in-the-air display optionally overlays the real object with an image of a virtual object. The detection system optionally detects when the user touches the real object, and optionally provides input to the display system, which optionally manipulates showing the virtual object in a manner similar to the user actually manipulating the real object.

Some aspects of some embodiments of the invention are used in augmented reality systems, where a user potentially sees real objects, such as his hand providing the tactile sense, as well as virtual objects.

Some aspects of some embodiments of the invention are used in virtual reality systems, where a user sees virtual objects, while real objects, such as his hand touching something, provide the tactile sense.

Example embodiments are typically described herein in terms of augmented reality, however, persons skilled in the art of virtual reality will understand how to implement these descriptions in a virtual reality environment.

According to an aspect of some embodiments of the present invention there is provided a method for providing tactile feedback in a display system including using a display to show an image of a virtual object in a viewing space, using a touch detector to detect a user touching a real object within the viewing space, and providing a location of the touching to the display.

According to some embodiments of the invention, the display is a three-dimensional display and detecting a user touching a real object within the viewing space includes detecting that the user touched the real object at a same location, in three dimensions, as the image of the virtual object appears to the user.

According to some embodiments of the invention, the user touching a real object within the viewing space includes the user touching at least one finger to the real object.

According to some embodiments of the invention, the real object includes a real object selected from a group consisting of a finger of the user's hand, a portion of the user's hand, a portion of the user's body, and a real object other than a part of the user's body.

According to some embodiments of the invention, further including controlling the showing of the virtual object to behave as if the virtual object is actually grasped by the user.

According to some embodiments of the invention, the showing an image of a virtual object includes showing by a head mounted display.

According to some embodiments of the invention, the detecting a user touching a real object within the viewing space is performed, at least in part, by a component in the head mounted display.

According to some embodiments of the invention, the showing an image of a virtual object includes showing a holographic image of the virtual object. According to some embodiments of the invention, the showing an image of a virtual object includes showing a stereoscopic image of the virtual object.

According to some embodiments of the invention, further including the touch detector detecting that the user's hand is not touching the real object, and the touch detector providing an indication that the user's hand is not touching to the display.

According to some embodiments of the invention, further including the display controlling the showing the virtual object to behave as if the virtual object is not held by the user's hand.

According to some embodiments of the invention, the showing the image of the virtual object further includes showing at least one virtual handle appearing in the viewing space.

According to some embodiments of the invention, the virtual handle appears as if attached to the virtual object.

According to some embodiments of the invention, a shape of the virtual handle is a shape of a line. According to some embodiments of the invention, a shape of the virtual handle is a shape of a straight line.

According to some embodiments of the invention, a shape of the virtual handle is a shape of a two-dimensional surface. According to some embodiments of the invention, a shape of the virtual handle is a shape of a flat two-dimensional surface.

According to some embodiments of the invention, wherein a shape of the virtual handle is a shape of a three-dimensional body.

According to some embodiments of the invention, the showing of the virtual object controls the showing the virtual object to appear to rotate around an axis of the virtual handle when the user touches the real object, and rotates the user's hand around the axis of the virtual handle.

According to some embodiments of the invention, further including inserting the real object, other than the user's hand, into the viewing space, detecting a location of the real object, overlaying an image of the virtual object onto the real object, using the touch detector to detect the user touching the real object, and manipulating showing the image of the virtual object corresponding to the user manipulating the real object.

According to an aspect of some embodiments of the present invention there is provided a floating-in-the-air display system for providing a tactile sense of apparently touching a virtual object shown by the system, including a display component for showing a virtual object in a viewing space, a touch detector for detecting a user touching a real object within the viewing space, measuring a location of detected touching of the real object and providing the location to the display component.

According to some embodiments of the invention, the touch detector is configured to detect the user touching at least one finger to the real object.

According to some embodiments of the invention, the real object includes a real object selected from a group consisting of a finger of the user's hand, a portion of the user's hand, a portion of the user's body, and a real object other than a part of the user's body.

According to some embodiments of the invention, the display component is configured, upon receiving a location of detected touching, to control showing of the virtual object to behave as if the virtual object is actually grasped by the user.

According to some embodiments of the invention, the touch detector includes a camera. According to some embodiments of the invention, the touch detector includes a glove.

According to some embodiments of the invention, the display component includes a head mounted display. According to some embodiments of the invention, the touch detection component is included in the head mounted display.

According to some embodiments of the invention, the display component includes a holographic image display. According to some embodiments of the invention, the display component includes a stereoscopic image display.

According to some embodiments of the invention, further including the touch detector being configured to detect that the user's hand is not touching the real object, and provide an indication that the user's hand is not touching to the display.

According to some embodiments of the invention, further including the display being configured to control the showing the virtual object to behave as if the virtual object is not held by the user's hand.

According to some embodiments of the invention, further including the display configured to show at least one virtual handle in the viewing space.

According to some embodiments of the invention, the display is configured to show the at least one virtual handle as if attached to the virtual object.

According to some embodiments of the invention, a shape of the virtual handle is a shape of a line. According to some embodiments of the invention, a shape of the virtual handle is a shape of a straight line.

According to some embodiments of the invention, a shape of the virtual handle is a shape of a two-dimensional surface. According to some embodiments of the invention, a shape of the virtual handle is a shape of a flat two-dimensional surface.

According to some embodiments of the invention, a shape of the virtual handle is a shape of a three-dimensional body.

According to some embodiments of the invention, the display component is configured to control showing the virtual object to appear to rotate around an axis of the virtual handle when the user touches the real object, and rotates the user's hand around the axis of the virtual handle.

According to some embodiments of the invention, further including the touch detector being configured to detect a location of a second real object, other than the user's hand, inserted into the viewing space, and provide a location of the second real object to the display component, and the display being configured to overlay an image of the virtual object onto the second real object.

According to some embodiments of the invention, further including the touch detector being configured to detect the user touching the second real object and provide a location of the detected touching of the second real object to the display component, and the display component being configured to control showing of the virtual object corresponding to the user manipulating the real object.

According to an aspect of some embodiments of the present invention there is provided a method for providing tactile feedback in a display system including using a display to show an image of a virtual object in a viewing space, using a touch detector to detect a user touching a real object within the viewing space, measuring a location of detected touching of the real object, and showing a virtual handle in the viewing space at the location of the detected touching.

According to an aspect of some embodiments of the present invention there is provided a method for providing tactile feedback in a display system including using a display to show an image of a virtual object in a viewing space, using a touch detector to detect a user using a first finger to touch a real object within the viewing space, measuring a first location of detected touching of the first finger and the real object, showing a first virtual handle in the viewing space at the first location, using a touch detector to detect the user using a second finger to touch the real object within the viewing space, measuring a second location of detected touching of the second finger and the real object, showing a second virtual handle in the viewing space at the second location, and controlling the showing of the virtual object to behave as if the virtual object is actually grasped by the user with two finger at the first location and at the second location.

According to some embodiments of the invention, the first finger and the second finger are on different hands.

According to some embodiments of the invention, further including controlling the showing of the virtual object to perform a user interface action selected from a group consisting of zooming in, zooming out, rotating, bending, and deforming in response to movement of the two fingers relative to each other.

According to an aspect of some embodiments of the present invention there is provided a method for providing tactile feedback in a three-dimensional display system including using a display to show a three-dimensional image of a virtual object in a three-dimensional viewing space, using a touch detector to detect a user touching a real object within the viewing space, measuring a three-dimensional location of the touching, and when the three-dimensional location of the touching is a same location as a location of the three-dimensional image of the virtual object, controlling the showing of the virtual object to behave as if the virtual object is actually touched by the user.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 is a simplified block diagram illustration of a floating-in-the-air display system for showing virtual objects according to an example embodiment of the invention;

FIG. 11 is a simplified illustration of users using a floating-in-the-air display system for showing virtual objects according to an example embodiment of the invention;

DESCRIPTION OF SPECIFIC EMBODIMENTS OF THE INVENTION

Figure 1:
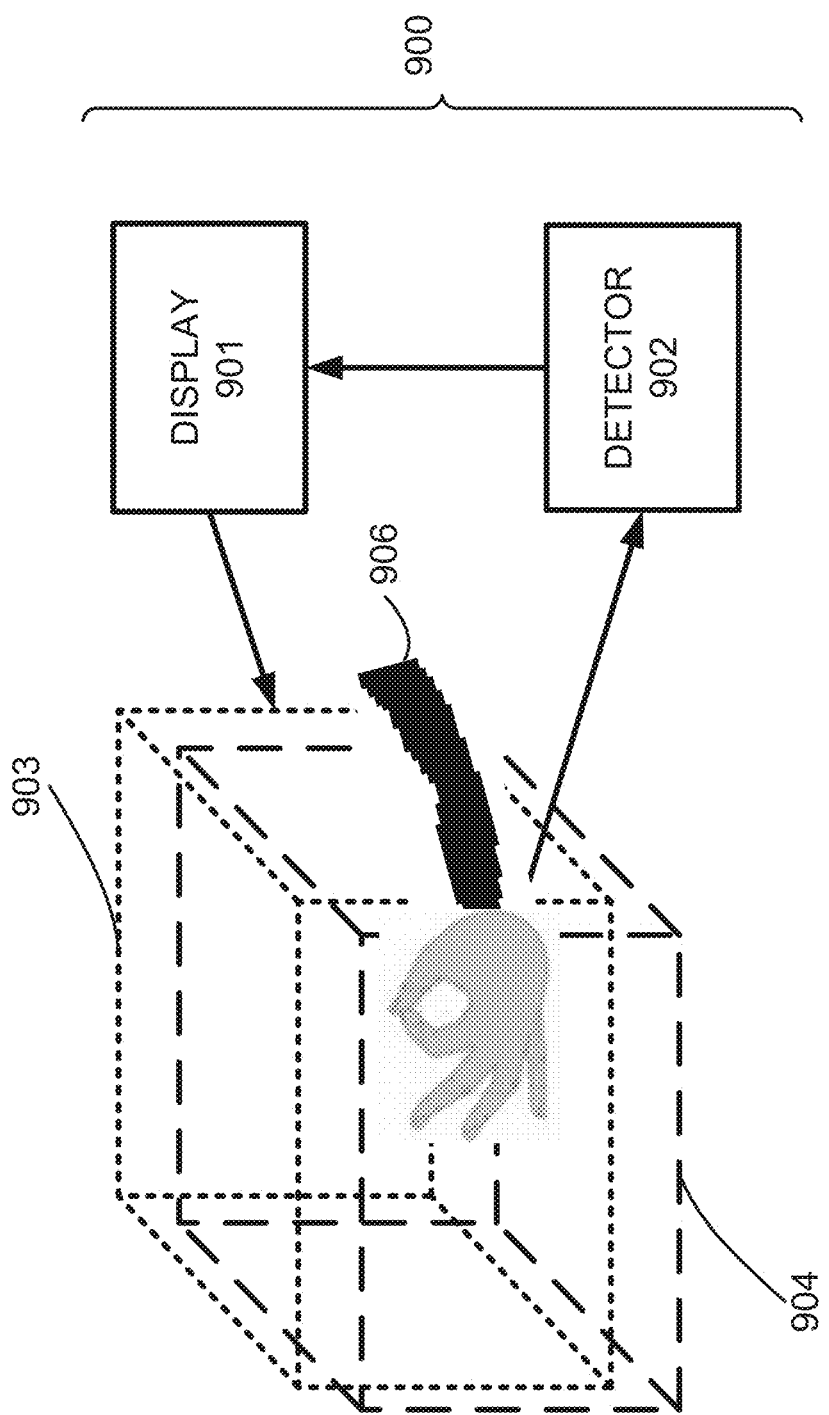
FIG. 1 is a simplified block diagram illustrations of a display system for showing a virtual object in a viewing space according to an example embodiment of the invention.

The present invention, in some embodiments thereof, relates to a method and a system for providing tactile feedback in a floating-in-the-air display system, and, more particularly, but not exclusively to tactile feedback in a virtual reality or augmented reality display system, and, even more particularly, but not exclusively to tactile feedback in a virtual reality or augmented reality user interface.

In some embodiments, the floating-in-the-air display system is a three-dimensional floating-in-the-air display system.

In some embodiments, the floating-in-the-air display system allows a user to reach into a same space or volume where an image appears to be. Some non-limiting examples of such displays include some holographic displays, and some stereoscopic displays.

In some embodiments, the floating-in-the-air display system is a holographic display, which visual depth cues to human perception including eye convergence and eye accommodation.

The term "floating-in-the-air" as applied to a display system and/or as applied to showing an image is used in the present specification and claims for displays and methods of displaying which show an image in a volume of space into which a user can insert a hand or some other object. By way of a non-limiting example, a head mounted display showing a three-dimensional stereoscopic or holographic image.

When an image appears in touching range, yet when reaching a hand to touch the image there is no tactile sensation, the user experience lacks reality, may confuse a user's brain, and may damage the user experience.

Of three-dimensional (3D) visual display technologies, only holography delivers all the visual depth cues as a real object, including eye accommodation and eye convergence.
Introduction By way of an introductory, non-limiting example, a user viewing an image of a virtual object, for example by using a head mounted display, reaches his hand to "touch" the virtual object. The user brings a first finger to a location of the virtual object, and also brings a second finger to touch his first finger. Now the user feels his fingers touching something . . . the fingers are touching each other.

An aspect of some embodiments of the invention relates to using that feeling together with the user's sense of sight to manipulate the showing of the virtual object as if the user is touching a real object while showing the virtual object.

An aspect of some embodiments of the invention relates to using that feeling as part of a user interface, and when a user feels a touching, to manipulate the showing of the image of virtual object as if the user is touching the virtual object.

In some embodiments, as long as the user feels the touching sensation, that is, for example, as long as the user touches a finger to a finger, the display shows the image of the virtual object as if the user is touching the virtual object. In some embodiments, when the user moves his hand, the virtual object is optionally shown moving as if stuck to his hand. In some embodiments, when the user moves his hand, the virtual object is optionally shown moving as if deforming to pressure from his hand.

In some embodiments, a user may use two hands, touching one virtual object, and a computer controlling the display causes the image of the virtual object to behave as expected from a corresponding real object when held by two hands. By way of a non-limiting example, the user may touch, in the sense described above, a virtual rubber band with two hands, and pull his hands apart, and the computer will control the displaying of the image of the virtual rubber band to appear as if the rubber band is pulled and stretched between the two hands. By way of a non-limiting example, the user may touch, in the sense described above, a virtual rubber ball with two hands, and push his hands together, and the computer will control the displaying of the image of the virtual rubber ball to appear as if the rubber ball is compressed between the two hands. By way of a non-limiting example, the user may touch, in the sense described above, an image of two virtual objects, and by distancing his hands from each other cause the display to show the two virtual objects separating from each other. In a similar fashion an image of two layers of tissue may be caused to be displayed as being peeled from each other.

An aspect of some embodiments of the invention relates to using a display for displaying virtual objects, and using a tracking system to track a user's hands within the same volume of space where the virtual object appears to be, to detect when the user touches something. In some embodiments a computer receives the hand-tracking data and calculates data for displaying the virtual object. In some embodiments detecting when a user touches something may be performed by other components, such as a glove for detecting touch, or an electric circuit for detecting when a finger touches a finger, a hand, or some other object.

A non-limiting example embodiment is when a user touches a real object which is not his other finger or the palm of his hand. For example, there may be a stick in the volume of space where the virtual object is displayed, and when the user grabs the stick, the user feels the touch of the stick, and the display system, from then on until the user releases the stick, manipulates the virtual image in response to the user moving the stick.

An aspect of some embodiments of the invention relates especially, but not exclusively, to floating-in-the-air displays which display objects within hand's reach of a user, so that the user can reach into an image display viewing space and apparently appear to touch an image of a virtual object.

In case a person sees an image of a virtual object within hand's reach and reaches his hand to touch the image of the virtual object, the brain perceives the visual depth cues, for example including eye accommodation and eye convergence and expects the somatosensory nervous system in the hand to send a touching sensation. As real as a virtual image may appear, the lack of touch sensation confuses the brain and may reduce an ability to interact with the 3D image. There is a natural touching sensation that can be used when interacting with a 3D image. For example, when grabbing a real paper with two fingers, the pressure triggering the somatosensory nervous system is induced by the fingers; one against the other, and not by the paper, which easily deforms against a finger. A non-limiting example is holding a very thin tool, for example with a diameter of a human hair, in the hand. The holding sensation is due to the pressure between one part of the hand and another part of the hand.

An aspect of some embodiments of the invention includes using such sensory techniques when interacting with a 3D image, thereby giving a user a natural touching sensation as part of a user interaction.

Some embodiments of the invention include using a solid object in the environment for producing a touching sensation, such as a user's body and/or clothing, or some other real object.

An aspect of some embodiments of the invention involves displaying an image of a virtual object in a viewing space, and when a user appears to touch the virtual object, and the user has a tactile sense of touching the real object, causing the virtual object to behave as if the user is touching or grasping or holding the virtual object.

The term virtual object is used in the present specification and claims to mean an object which is displayed by an image display, including holographic image displays, other three-dimensional image displays, and two-dimensional image displays.

In some embodiments the tactile sense of touching the real object is caused by the user touching a portion of his body, for example touching a finger to a finger' or to some other part of the user's hand or body or to an object.

The terms "touching" is used in the present specification and claims in all its grammatical forms to mean a user touching something, such as his own hand or finger or some other object, in a vicinity of a virtual object, and the touching being implemented as a user interface state of the user touching the virtual object.

The terms "grasping" or "grabbing" or "holding on" or "holding onto" are used in the present specification and claims to mean a user touching something, such as his own hand or finger or some other object, in a vicinity of a virtual object, and the touching being implemented as a user interface state of the user grasping or grabbing or holding onto the virtual object.

In some embodiments the tactile sense of touching the real object is caused by the user touching a real object present in the viewing space. In some embodiments the real object is actually in a vicinity of the displayed virtual object, for example within a range of 0-10-25 millimeters, or even more, of the apparent location of the displayed virtual object.

By way of a non-limiting example, a user viewing a display of a virtual displayed object, for example by using a head mounted display, reaches his hand to touch the virtual object. The user optionally touches a first finger to a location of the virtual object, and also brings a second finger to touch his first finger. This scenario may also be described differently—the user touches the first finger to the second finger at the apparent location of the virtual object. The second finger touching the first finger provides a sense of touch, or tactile feedback. An object detection system viewing the viewing space in which the virtual object is displayed detects when the fingers touch each other, and optionally provides input to the display system, and the display system optionally calculates producing a display of the virtual object in a manner similar to the user actually manipulating a real instance of the virtual object. The user thus senses the tactile feeling of touching something, and views the virtual object being manipulated.

In some embodiments, touching an object in the viewing space initiates a state of a user grabbing, or holding on to an image of a virtual object in the viewing space, and ending the touching causes the state of holding on to the image of the virtual object to end. While in a state holding on to the image of the virtual object, a user manipulates the image of the virtual object similarly to manipulating an actual object. When the user moves his hand, the image of the virtual object moves correspondingly. When the user rotates his hand, the image of the virtual object rotates correspondingly.

In some embodiments, when a user grabs, or holds on to two locations on a same object, the tracking system detects two locations where the user has touched finger to finger or finger to object, and tracks the user moving the two locations. For example, a user may use two hands and pinch two fingers together in each one of the hands.

In some embodiments, when the user moves the two locations relative to each other, while still holding on, the display system optionally performs image manipulations natural to the movement. Some non-limiting examples: when the two locations are pulled away from each other, the display system may optionally zoom, that is, makes the virtual object larger, or may distort the image of the virtual object to increase the distance between the two locations on the image of the virtual object, thus distorting the image of the virtual object; when the two locations are pushed toward each other, the display system may optionally zoom, that is, makes the virtual object smaller, or may distort the image of the virtual object to decrease the distance between the two locations on the image of the virtual object, thus distorting the image of the virtual object.

In some embodiments, the system optionally highlights locations on an image of a virtual object where the system supports grabbing. At such locations, or near such locations, a user may use the touching of a real object to hold on to the virtual object, and the system will compute and display manipulations of the image of the virtual object corresponding to the user's movement of the locations while touching. At other locations, not highlighted, even when the user touches finger to finger or finger to object, the system refrains from providing the holding-on metaphor.

In some embodiments, the system optionally displays protrusions of or voids in the image of the virtual object, which mark locations where a user's touching an object will be interpreted as the user holding on to the virtual object, and support for manipulations of the image of the virtual object is provided.

Such protrusions or voids are termed herein handles.

In some embodiments the handles are optionally shaped to correspond to handle naturally expected by a human user. By way of some non limiting examples, handles of an image of a virtual food may optionally be shaped as a utensil such as a fork stuck in the food, or a spoon in a drink.

In some embodiments a handle may appear as a line, approximately representing a one-dimensional line, extending from the virtual object. Such a handle is optionally used to provide virtual object manipulations such as causing the image of the virtual object to move in all directions, and/or rotating the image of the virtual object around an axis defined by the long axis of the line handle.

In some embodiments a handle may appear as a flat, approximately two-dimensional shape extending from the image of the virtual object. Such a handle is termed herein a leaf. Such a leaf handle is optionally used to provide virtual object manipulations such as causing the image of the virtual object to move in all directions, and/or rotating around the image of the virtual object corresponding to a rotation of a grasping hand/finger.

In some embodiments a handle may appear as a ring shape extending from the image of the virtual object. Such a ring shaped handle is optionally used to provide virtual object manipulations such as pulling the image of the virtual object to move in a specific direction, and/or pulling the image of the virtual object to stretch in a specific direction.

In some embodiments a handle may appear as a more solid, more three dimensional shape extending from the image of the virtual object. Such a handle is termed herein a knob. Such a knob handle is optionally used to provide virtual object manipulations such as causing the image of the virtual object to move in all directions, and/or rotating around the image of the virtual object corresponding to a rotation of a grasping hand/finger.

In some embodiments, causing handles to be displayed in a display, on an image of a virtual object, is performed in response to a user interface command. The user interface command may optionally be provided by a user interface command as is known in the art, such as a mouse command, a keyboard command, a spoken command, and so on. In some embodiments the user interface command is optionally gesture made by a user in a viewing space of the image of the virtual object, such as when a tracking system observing the viewing space detects the user touching finger to some object, be it a finger, a palm of the hand, some real object in the viewing space.

In some embodiments the user interface command is optionally when the user apparently touches the image of the virtual object, that is, when the user reaches his finger or hand to location where the system knows it is displaying the virtual object.

In some embodiments the user interface command is optionally when the user apparently touches a surface of the image of the virtual object, that is, when the user reaches his finger or hand to location where the system knows it is displaying the surface of the virtual object.

In some embodiments, haptic gloves may be used. The haptic gloves optionally serve for sensing when fingers are touching each other and providing data that a finger is touching an object/finger/hand to the system for starting a scenario where a user is holding onto an object.

In some embodiments, gloves may be used, the gloves optionally providing additional sensory input to a user, such as vibrating when touch is detected, or heating or cooling when touch is detected.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1 which is a simplified block diagram illustrations of a display system for showing a virtual object in a viewing space according to an example embodiment of the invention.

FIG. 1 depicts an example floating-in-the-air display system 900 including a display component 901 and a touch detector 902.

The display component 901 displays a floating-in-the-air image 905 of a virtual object in a viewing space 903.

The touch detector 902 monitors a volume of space 904 including at least part of the viewing space 903.

In some embodiments the touch detector 902 optionally sends the display component 901 an indication that a user 906 is touching a real object.

In some embodiments the touch detector 902 optionally sends the display component 901 a location, for examples coordinates of the location, where the user 906 is touching the real object.

The real object which the user 906 is touching may be any real object.

Various embodiments of touch detectors are possible. Some non-limiting examples are:

One or more cameras, which monitor the volume of space 904 and detect when the user 906 is touching a real object, or when the user 906 is touching a finger or some other part of his body. Such a camera or cameras may optionally also detect a location in space where the touch occurred. The location in space may be detected by triangulation among images from several cameras, and/or by using one or more range finders to measure a distance to the location where touch occurred.

A tracking system such as a Kinect system may be used as a touch detector.

A glove on the user's hand may be used to detect touch of the hand to any real object or body part. Distance to the touch location may be measured as described above, using cameras and triangulation and/or range finding to the location where the cameras observe touch, optionally following a touch detection by the glove.

FIG. 1 shows a non-limiting example of the user 906 touching one finger, such as a thumb, to a finger.

Additional non-limiting examples (not shown) include the user 906 touching some other body part, not necessarily a finger, or a part of his hand, or a hand of another user inserted into the same monitored volume of space 904, or touching some other object like a stick, a tool, and so on.

In some embodiments components for building a floating-in-the-air display system according to an example embodiment of the invention optionally include a monitoring component for monitoring the monitored volume of space 904; a computing unit (not shown); and a display for showing a virtual image within the viewing space 903. In some embodiments the monitoring component may be a camera viewing the monitored volume of space 904, and the computing unit may be a component for analyzing data from the camera and detecting touch, optionally calculating location of the touch, optionally calculating data for the display 901 to use for showing the virtual image.

In some embodiments components for building a floating-in-the-air display system according to an example embodiment of the invention optionally include a monitoring component for monitoring the monitored volume of space 904; a glove for detecting touch, a computing unit (not shown); and a display for showing a virtual image within the viewing space 903. In some embodiments the monitoring component may be a camera viewing the monitored volume of space 904, and the computing unit may be a component for analyzing data from the camera and optionally calculating location of a touch detected by the glove, optionally calculating data for the display 901 to use for showing the virtual image.

In some embodiments components for building a floating-in-the-air display system according to an example embodiment of the invention optionally include a monitoring component for monitoring the monitored volume of space 904; a rangefinder for measuring a range from the rangefinder to real objects within the monitored volume of space 904, a computing unit (not shown); and a display for showing a virtual image within the viewing space 903. In some embodiments the monitoring component may be a camera viewing the monitored volume of space 904, and the computing unit may be a component for analyzing data from the camera and detecting touch, optionally calculating location of the touch, optionally also using data from the rangefinder, optionally calculating data for the display 901 to use for showing the virtual image.

Figure 2:
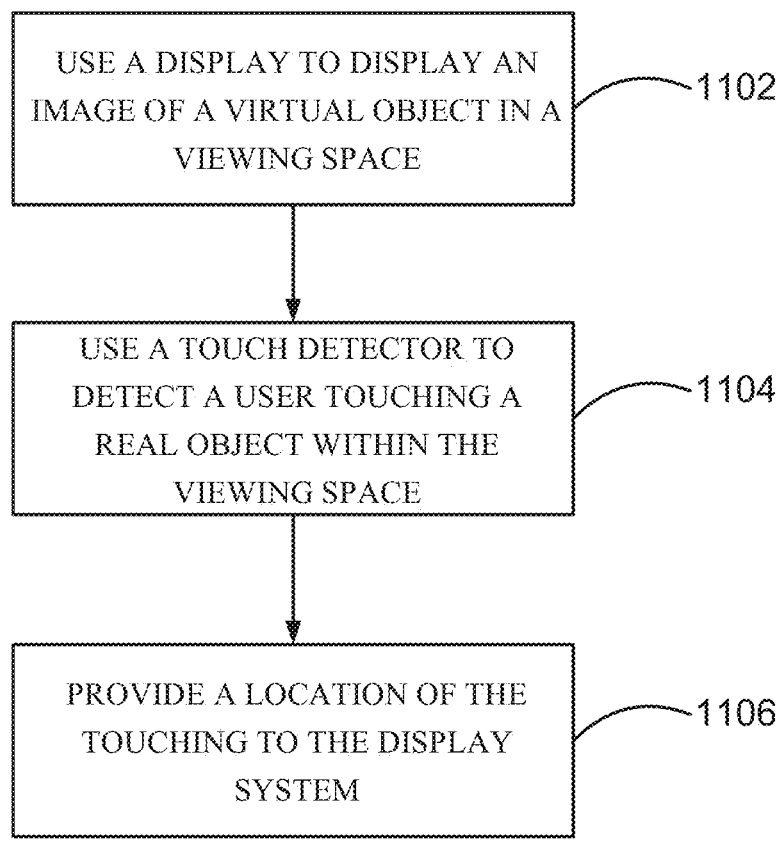
FIG. 2 is a simplified flow chart diagram illustration of a method for providing tactile feedback in a display system according to an example embodiment of the invention.

Reference is now made to FIG. 2 which is a simplified flow chart diagram illustration of a method for providing tactile feedback in a display system according to an example embodiment of the invention.

The method of FIG. 2 includes:

using a display to display an image of a virtual object in a viewing space (1102);

using a touch detector to detect a user touching a real object within the viewing space (1104); and the touch detector providing a location of the touching to the display system (1106).

Figure 3:
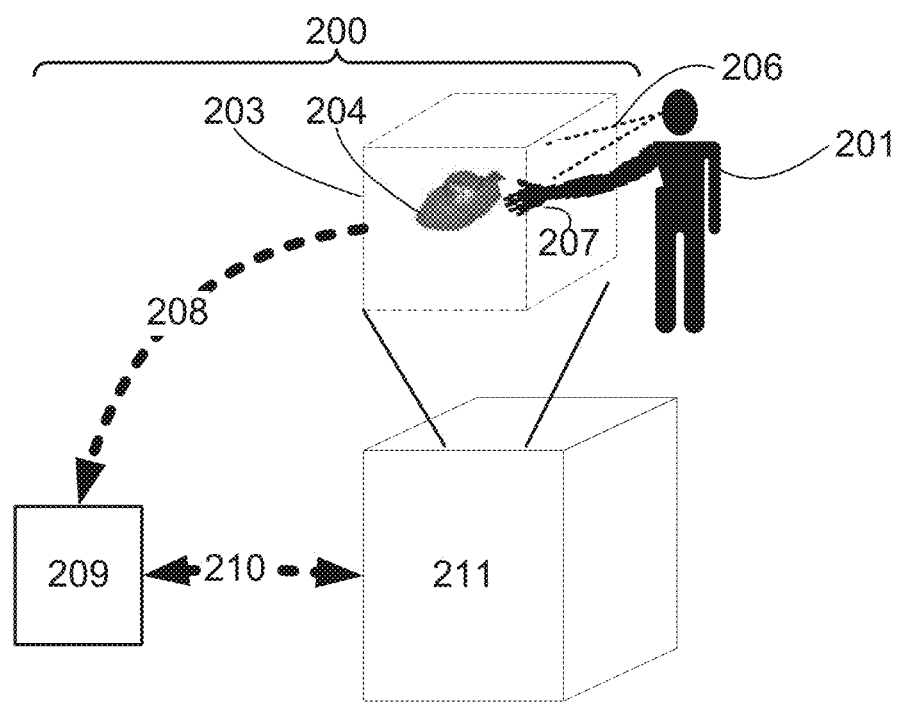
FIG. 3 is a simplified block diagram illustration of a floating-in-the-air display system for showing a virtual object in a viewing space according to an example embodiment of the invention.

Reference is now made to FIG. 3, which is a simplified block diagram illustration of a floating-in-the-air display system 200 for showing a virtual object 204 in a viewing space 203 according to an example embodiment of the invention.

A user 201 views 206 the virtual object 204 and extends a hand 207 into the viewing space 203 to a location where the hand 207 appears to touch the virtual object 204.

An object tracking component (not shown—may optionally be part of a head mounted unit worn by the user, may optionally be part of a display 211, or may optionally be packaged separately from the display 211) optionally provides object location data 208 of objects within the viewing space, or in some volume at least partially overlapping with an apparent location of an image of the virtual object, to a computing component 209. The computing component 209 optionally provides data 210 to the display 211.

The data 210 may include one or more of the following:
- an indication that the hand 207 is touching the virtual object, that is immediately next to or even within a location of the image of the virtual object;
- a command to display one or more handles on the virtual object 204; and
- all data required for displaying the virtual object 204, for example when computing power is in the computing component 209 and the display 211 serves for displaying according to data sent by the computing component 209.

In some embodiments the display 211 is a holographic display for displaying three-dimensional holographic images.

Reference is now made to FIG. 4, which is a simplified block diagram illustration of a floating-in-the-air display system for showing virtual objects according to an example embodiment of the invention.

FIG. 4 displays a first space 501 which is being monitored by a tracking component 502. The tracking component 502 provides data to a computer 512, optionally including a location of a user's hand and/or other real objects within the first space 501. Additional data optionally provided by the tracking component may include when tracked objects in the first space 501 touch each other.

The computer 512 optionally provides display data to a display 514, which displays a scene including one or more virtual objects in a display space 516.

In some embodiments the first space 501 and the display space 516 overlap. The overlap may be such that: the first space 501 completely includes the display space 516 and may even be larger than the display space 516; the display space 516 completely includes the first space 501 and may even be larger than the first space 501; there may be an exact overlap, where both the first space limits and the second space limits are exactly the same; and the first display space 501 may partially overlap the display space 516, as is shown in FIG. 4. The degree of partial overlap may be any value between a fraction of one percent and up to 100%.

FIG. 4 also shows that the computer 512 may optionally receive input from conventional computer inputs such as a mouse 504, sound input 505, and other conventional input(s) 509. Such input may serve to control when the system is to display handles, as described elsewhere herein, or mark to highlight touchable portions of a virtual object as described elsewhere herein.

In some embodiments tracking systems such as Leaf or Kinect may optionally be used to monitor hand and/or finger locations and/or gestures within and near an image viewing space.

In some embodiments a user may use a vocal command such as 'pencil', or 'leaf' and the like, or by a mouse click or by a pre-determined command, or by choosing from a virtual menu optionally displayed next to or as part of the 3D image. When the user reaches his/her fingers to grip, the display optionally adds an image of a virtual tool such as a pencil at a vicinity of the user's fingers in a position and/or orientation of the virtual tool relative to the hand. The tool/pencil diameter may be in a range of 0.1 mm to 1 cm, or more or less.

In some embodiments the user closes his fingers as if gripping the tool/pencil. The user optionally feels the grip of his hand. A tracking system optionally identifies the gripping, and optionally when the user moves or tilts his/her hand the projection system moves and tilts the tool/pencil image accordingly, as if the pencil is gripped by the user.

In some embodiments the user appearing to grip and manipulating an image of a virtual tool/pencil with his hand movements is optionally used to mark a point or draw a line in the image of the virtual object. In some embodiments the marking or drawing are optionally activated by a command, such as a keyboard command or a voice command such as 'Mark'. In some embodiments the image of the virtual object may optionally be cropped according to a manipulation of the image of the virtual tool/pencil, optionally activated by a command such as 'Crop'. In some embodiments a surface of the image of the virtual object may optionally be colored or painted by manipulating the virtual tool/pencil, optionally activated by a command such as 'Brush'.

Figure 5A:
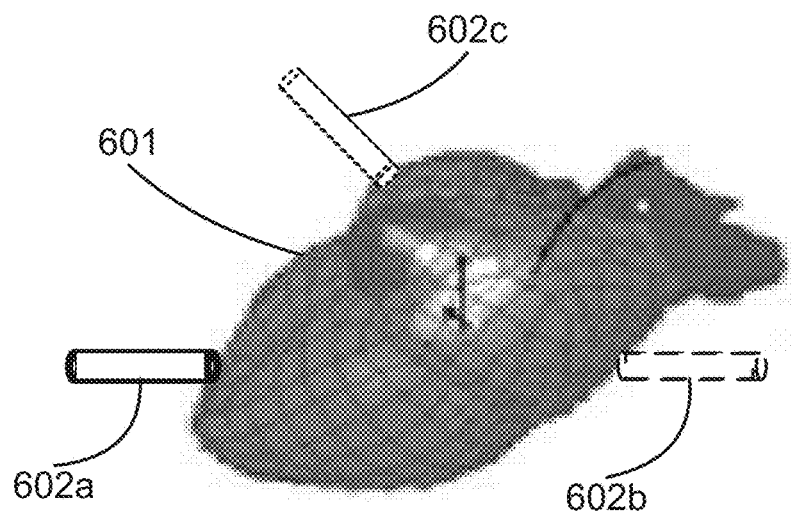
FIGS. 5A, 5B and 5C are simplified illustrations of handles displayed in images of a virtual object, according to an example embodiment of the invention.
Figure 5B:
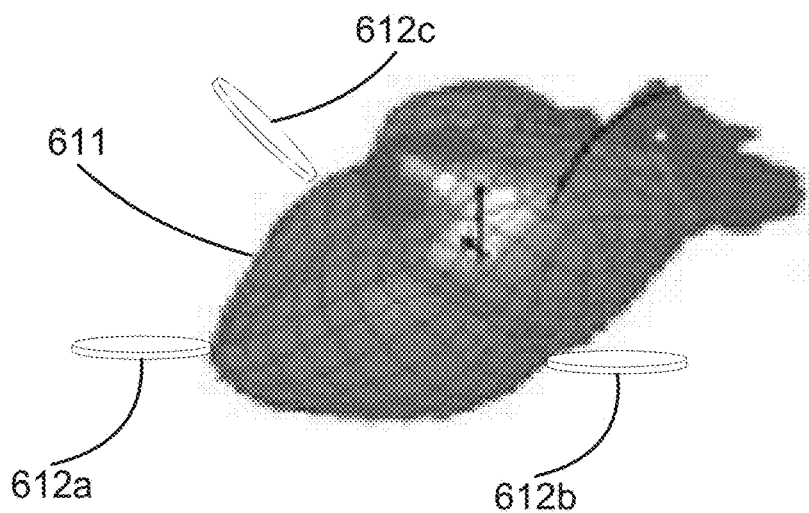
Figure 5C:
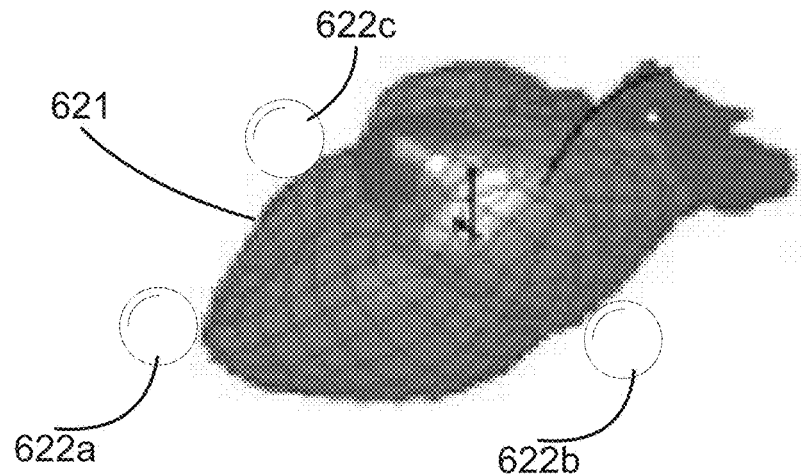

Reference is now made to FIGS. 5A, 5B and 5C which are simplified illustrations of handles displayed in images of a virtual object, according to an example embodiment of the invention.

FIG. 5A displays a virtual object 601, in this case a heart, and one or more substantially one-dimensional handles 602a 602b 602c appearing to jut out from the heart.

In some embodiments just one handle, for example a first handle 602a, is displayed with the display of the virtual object 601.

Displaying just one handle is enough to potentially support providing a user interface experience of a user grabbing a handle, for example by touching finger to thumb at the apparent location of the handle, and moving the image of the virtual object around, by virtue of a tracking component tracking the user's hand and producing images shifted in space corresponding to the movements of the user's hand.

Displaying just one handle is also enough to potentially support providing a user interface experience of a user grabbing a handle, for example by touching finger to thumb at the apparent location of the handle, and rotating the image of the virtual object around, by virtue of a tracking component tracking the user's hand and producing images rotated in space corresponding to the movements of the user's hand.

In some embodiments two handles, for example the first handle 602a, and a second handle 602b are displayed with the display of the virtual object 601. Movements which are supported by grabbing one handle are also supported by grabbing two handles.

FIG. 5A shows the second handle 602b in line with the first handle 602a. When the two handles are in line, a user interface provided to the user optionally includes treating the two inline handles 602a 602b as an axis, and rotating the virtual object 601 correspond to rotation of the grasping hands, optionally without shifting a center of the virtual object in space.

In some embodiments two handles, for example the first handle 602a, and a second handle 602c are displayed with the display of the virtual object 601. FIG. 5A shows the second handle 602c not in line with the first handle 602a. However, movements which are supported by grabbing one handle are also supported by grabbing two handles.

In some embodiments, grabbing two handles and apparently changing an angle between the two handles optionally produces a user interface command to distort the image of the virtual object and bend the image, optionally but not necessarily by an equal or proportional angle.

In some embodiments, grabbing two handles and apparently changing a distance between the two handles optionally produces a user interface command to enlarge or reduce a size of the image of the virtual object, optionally but not necessarily by an equal or proportional amount or percentage as the change of distance.

In some embodiments three (or more) handles, for example the first handle 602a, the second handle 602b and a third handle 602c are displayed with the display of the virtual object 601.

Movements which are supported by grabbing one handle are also supported by grabbing three (or more) handles.

It is noted that the handles may be spatially arranged next to the virtual object in any arrangement, including arrangements which potentially promote a natural understanding of user-interface commands optionally associated with a specific arrangement, such as the in-line rotation and/or bending and/or scaling size described herein.

In some embodiments the image of the handle(s) handles may be controlled to behave as a flexible handle. By way of a non-limiting example, when the user moves his hand, the handle(s) may bend, and/or the handles may be completely stiff and not bend.

In some embodiments a user optionally causes handles to be produced at specific locations. By way of a non-limiting example the specific locations may be selected by touching a finger at an apparent surface of an image of a virtual object. By way of a non-limiting example the specific locations may be selected by pointing a tool at the apparent surface of the image of the virtual object, and having a computer or the display calculate a location where the tool direction intersects that surface.

In some embodiments tracking systems such as Leaf or Kinect may optionally be used to monitor hand and/or finger locations and/or gestures within and near an image viewing space.

In some embodiments a user may use a vocal command such as 'pencil', or 'leaf' and the like, or by a mouse click or by a pre-determined command, or by choosing from a virtual menu optionally displayed next to or as part of the 3D image. When the user reaches his/her fingers to grip, the display optionally adds an image of a virtual tool such as a pencil at a vicinity of the user's fingers in a position and/or orientation of the virtual tool relative to the hand. The tool/pencil diameter may be in a range of 0.1 mm to 1 cm, or more or less.

In some embodiments the user closes his fingers as if gripping the tool/pencil. The user optionally feels the grip of his hand. A tracking system optionally identifies the gripping, and optionally when the user moves or tilts his/her hand the projection system moves and tilts the tool/pencil image accordingly, as if the pencil is gripped by the user.

FIG. 5B displays a virtual object 611, in this case a heart, and one or more substantially two-dimensional handles 612a 612b 612c appearing to jut out from the heart. The two-dimensional handles may optionally be termed leaves in the present specification and claims.

FIG. 5B shows three example leaves 612a 612b 612c arranged similarly to the three example one-dimensional handles 602a 602b 602c of FIG. 5A.

It is noted that the leaves may be spatially arranged next to the virtual object in any arrangement, including arrangements which potentially promote a natural understanding of user-interface commands optionally associated with a specific arrangement, such as the in-line rotation and/or bending and/or scaling size described herein.

All potential user interface actions described above with reference to the one-dimensional handles 602a 602b 602c are also achieved by user interaction with the leaves 612a 612b 612c.

FIG. 5C displays a virtual object 621, in this case a heart, and one or more substantially three-dimensional handles 622a 622b 622c appearing to jut out from the heart. The three-dimensional handles may optionally be termed knobs in the present specification and claims.

FIG. 5C shows three example knobs 622a 622b 622c arranged similarly to the three example one-dimensional handles 602a 602b 602c of FIG. 5A.

All potential user interface actions described above with reference to the one-dimensional handles 602a 602b 602c are also achieved by user interaction with the knobs 622a 622b 622c.

It is noted that the knobs may be spatially arranged next to the virtual object in any arrangement, including arrangements which potentially promote a natural understanding of user-interface commands optionally associated with a specific arrangement, such as the in-line rotation and/or bending and/or scaling size described herein.

In some embodiments a user optionally provides a vocal command such as 'pistol' or 'pointer'. When the user reaches his/her fingers to grip the virtual tool, the display optionally adds an image of a virtual tool or pistol or pointer to the viewing space, optionally with the handle of the tool/pistol/pointer at a vicinity of the fingers in an estimated position and orientation of the handle relative to the hand. In some embodiments the user closes his fingers and grips the pistol. The user feels the gripping, and the tracking system optionally identify the gripping. In some embodiments the user can move or tilt his/her hand thereby optionally moving and/or tilting the image of the tool/pistol/pointer.

In some embodiments, for example in case of an image of a pistol or a pointer, apparently pulling a virtual trigger or pressing a virtual button are optionally used to mark a point where an image of a virtual object intersects with direction of the pistol barrel or direction of the pointer. In some embodiments a continuous pull on the virtual trigger or press on the virtual button is optionally used to mark a line in the image of the virtual object, to crop the image, or to paint a surface of the image of the virtual object. In some embodiments, for example in case of a pointer tool, a laser-pointerlike image is optionally realized by imaging a laser beam projected from the pointer to the image of the virtual object and optionally illuminating the image of the virtual object based on the location and orientation of the hand gripping the pointer.

It is noted that handles may be shaped to indicate their user interface purpose. The handles are virtual images optionally added to a virtual object. In some embodiments, the handles are shaped to indicate associate user interface commands.

By way of some non-limiting example, handles which are designed to implement a user interface zooming command are optionally shaped as rings, and potentially implement a zooming of a virtual object size when pulled; handles which are designed to implement a user interface shrinking command are optionally shaped as knobs, and potentially implement a zooming of a virtual object size when pulled; handles which are designed to implement a user interface rotate command are optionally shaped as leaves, and potentially implement a rotation of a virtual object size when pulled.

In some embodiments, an iconography of handle shapes corresponding to user manipulations of the virtual object is implemented.

In some embodiments, a dictionary of handle shapes corresponding to user manipulations of the virtual object is implemented.

A non-limiting example of a dictionary of handle shapes includes handle shapes which fit a shape of a touching surface for various combinations of a closed hand, a closed two fingers, a closed three fingers, a thumb touching an opposing finger, and so on.

In some embodiments enabling a manipulation of a virtual object is performed without adding shapes of virtual handles to the image of the virtual object. In some embodiments, a portion of an image of a virtual object is optionally highlighted or marked, and when a user is detected to touch his own hand or some real object at a location which is thus highlighted/marked, the display manipulates the image of the virtual object as if the user is grasping the virtual object at this location.

In some embodiments enabling a manipulation of a virtual object is performed without displaying virtual handles. In some embodiments, an image of a virtual object is optionally marked, and when a user is detected to touch his hand or some real object at an object which is thus highlighted/marked, the display manipulates the image of the virtual object as if the user is grasping the virtual object.

In some embodiments, a handle in a shape of a ring potentially enables an intuitive touch feeling, in that the handle resembles a real life ring, and in a real life ring fingers can touch through the hole of the ring.

In some embodiments a handle may be provided, by way of displaying a virtual image of the handle, with apparent physical qualities. By way of a non-limiting example, the handle may be displayed as behaving as a string or rope, which is connected to the virtual object at a specific location, and only enables pulling the image of the virtual object.

In some embodiments a handle may be provided, by way of displaying a virtual image of the handle, with constraints on the movement which the handle may impart to the image of the virtual object. By way of a non-limiting example, the handle may be constrained to enable only moving the image of the virtual object on a straight line, or on an arc.

In some embodiments a user may insert a real handle into a viewing space of a virtual object. When the real handle overlaps, or partially overlaps, with an image of a virtual handle, the display system causes the image of the virtual handle to start functioning as a handle In some embodiments a user may point to a location on a virtual object, and the location optionally appears to sprout a handle. In some embodiments, pointing to a second location optionally determines a direction of an axis of the handle as the direction between the two locations.

Figure 6A:
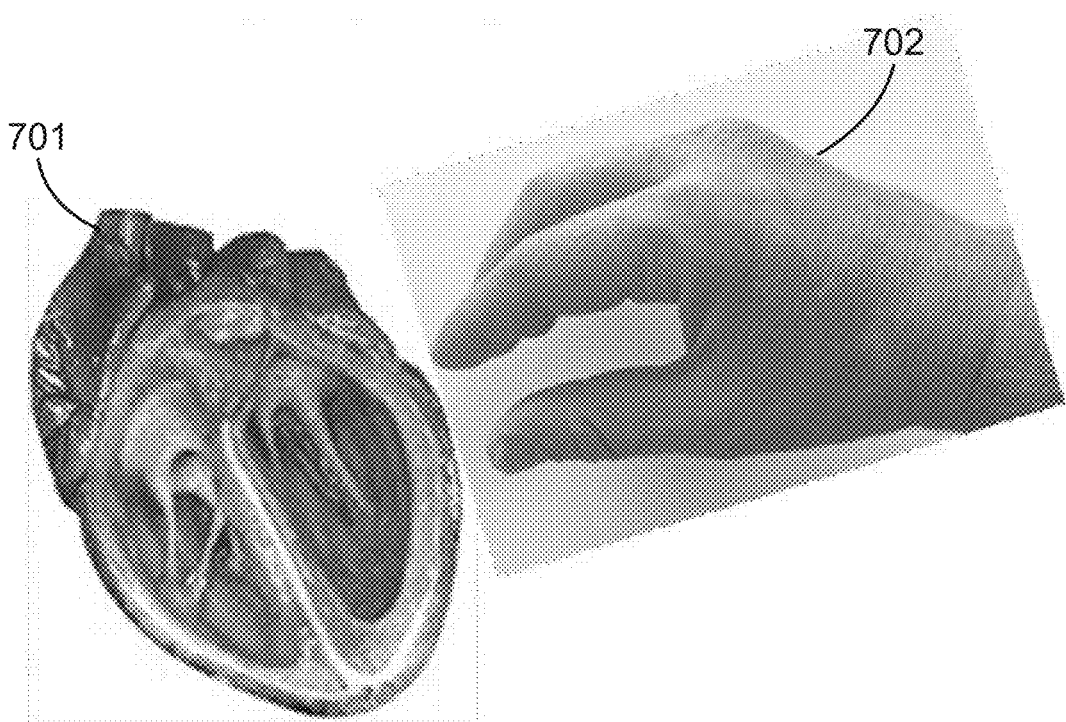
FIGS. 6A, 6B and 6C are simplified illustrations of a user's hand interacting with an image of a virtual object, according to an example embodiment of the invention.
Figure 6B:
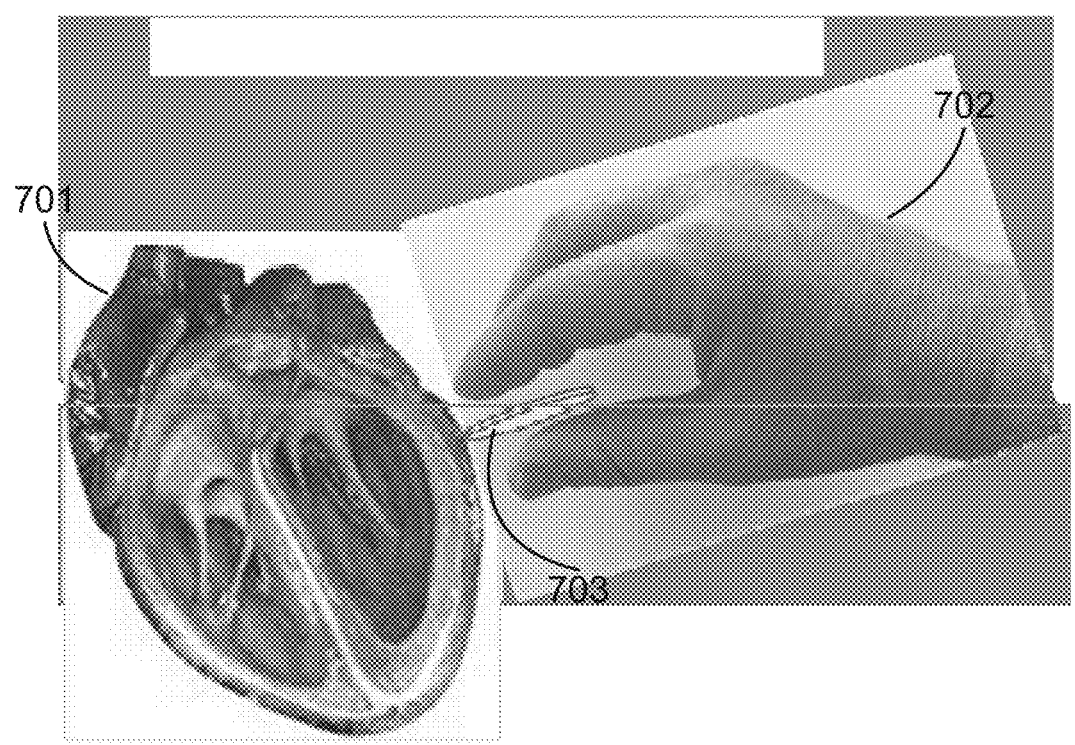
Figure 6C:
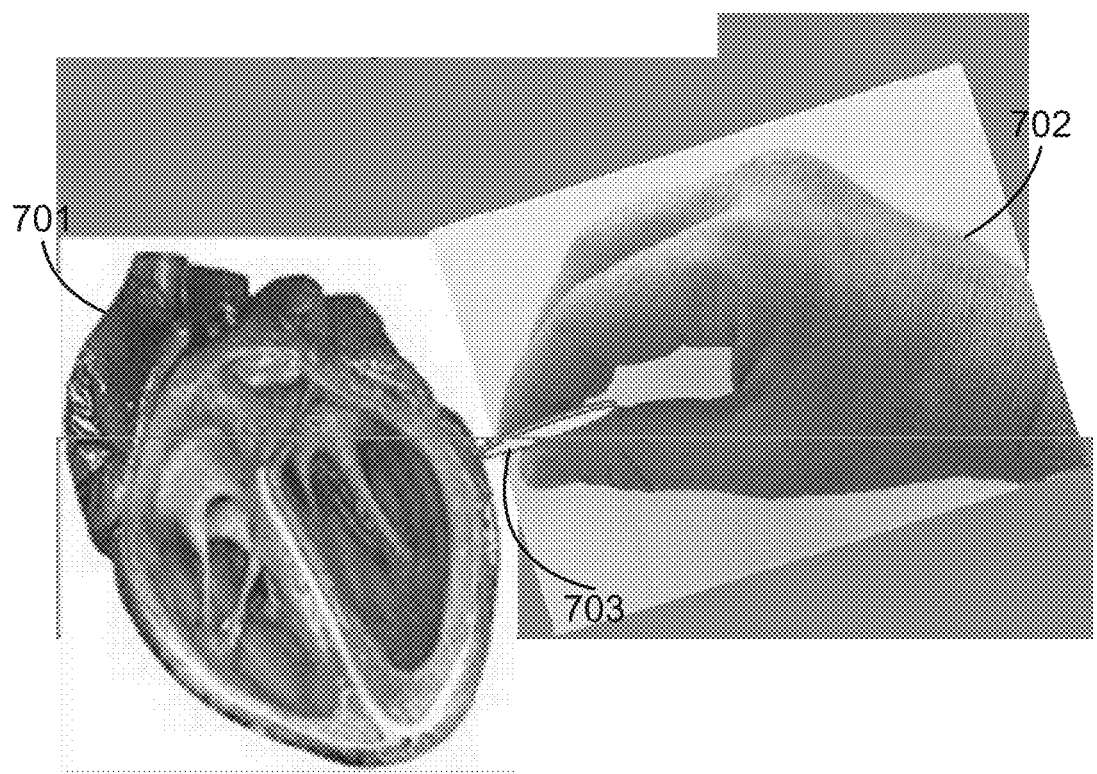

Reference is now made to FIGS. 6A, 6B and 6C which are simplified illustrations of a user's hand interacting with an image of a virtual object, according to an example embodiment of the invention.

FIG. 6A displays an image of a virtual object 701, in this case a heart, and a user's hand 702 approaching a vicinity of the image of the virtual object 701. The user sees both the hand 702, which is a real object, and the image of the virtual object 701.

In some embodiments the user's hand performs a gesture, optionally such as shown in FIG. 6A, so that a tracking unit can detect the gesture and optionally cause a display of the image of the virtual object to add a handle (not shown in FIG. 6A) to the image of the virtual object 701. In some embodiments, the handle (not shown) is added to a location near the user's hand 702, optionally a location nearest the user's hand.

In some embodiments the display adds a handle whenever the hand 702 is closer than a specific threshold distance to the image of the virtual object.

In some embodiments the display adds a handle when provided a user interface commands by a conventional tool, such as a mouse, a voice command, and other similar commands.

FIG. 6B displays the image of the virtual object 701, the user's hand 702, and a handle 703 apparently attached to the virtual object 701. The user sees both the hand 702, which is a real object, and the image of the virtual object 701, and the image of the handle 703.

In some embodiments, such as shown in FIG. 6B, the handle 703 is displayed prior to the user closing his fingers on the handle, for example in response to a user interface command such as the above-mentioned gesture, or to a conventional user interface command.

In some embodiments, not as shown in FIG. 6B, the handle is not displayed until the user performs a grabbing action at a vicinity of the virtual object 701, for example the handle is not shown until the user touches one finger to another.

FIG. 6C displays the image of the virtual object 701, the user's hand 702, and the handle 703 apparently attached to the virtual object 701. The user sees both the hand 702, which is a real object, and the image of the virtual object 701, and the image of the handle 703. The user feels one finger touching the other, providing a tactile sense of touching or grabbing the handle 703.

In some embodiments, when the used touches his fingers to each other and achieves a tactile sense of holding on to the handle, the system enters a user interface mode where movements performed by the user's hand 702 are translated to manipulations of the virtual object 701, as described elsewhere herein.

Figure 7A:
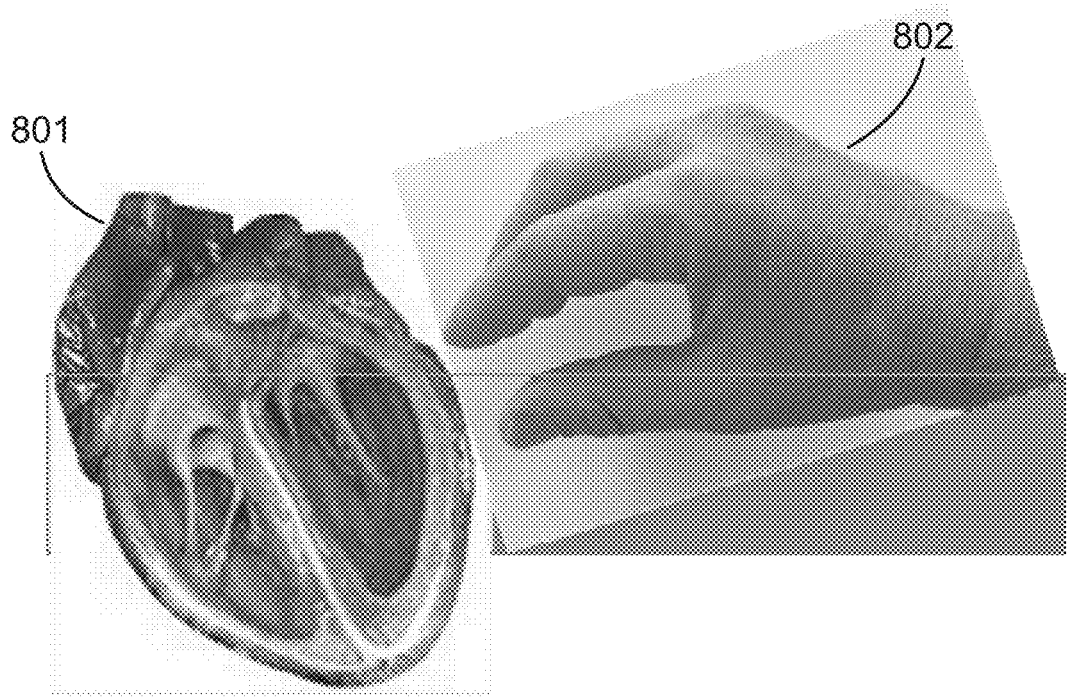
FIGS. 7A, 7B and 7C are simplified illustrations of a user's hand interacting with an image of a virtual object, according to an example embodiment of the invention.
Figure 7B:
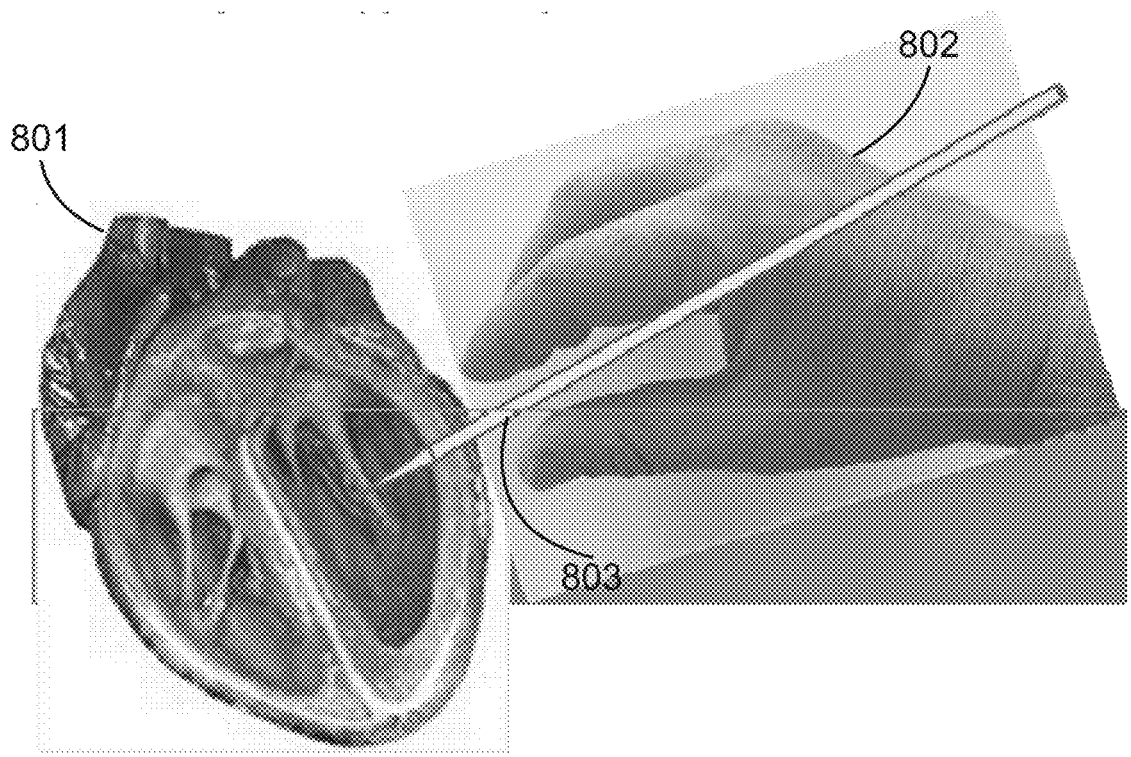
Figure 7C:
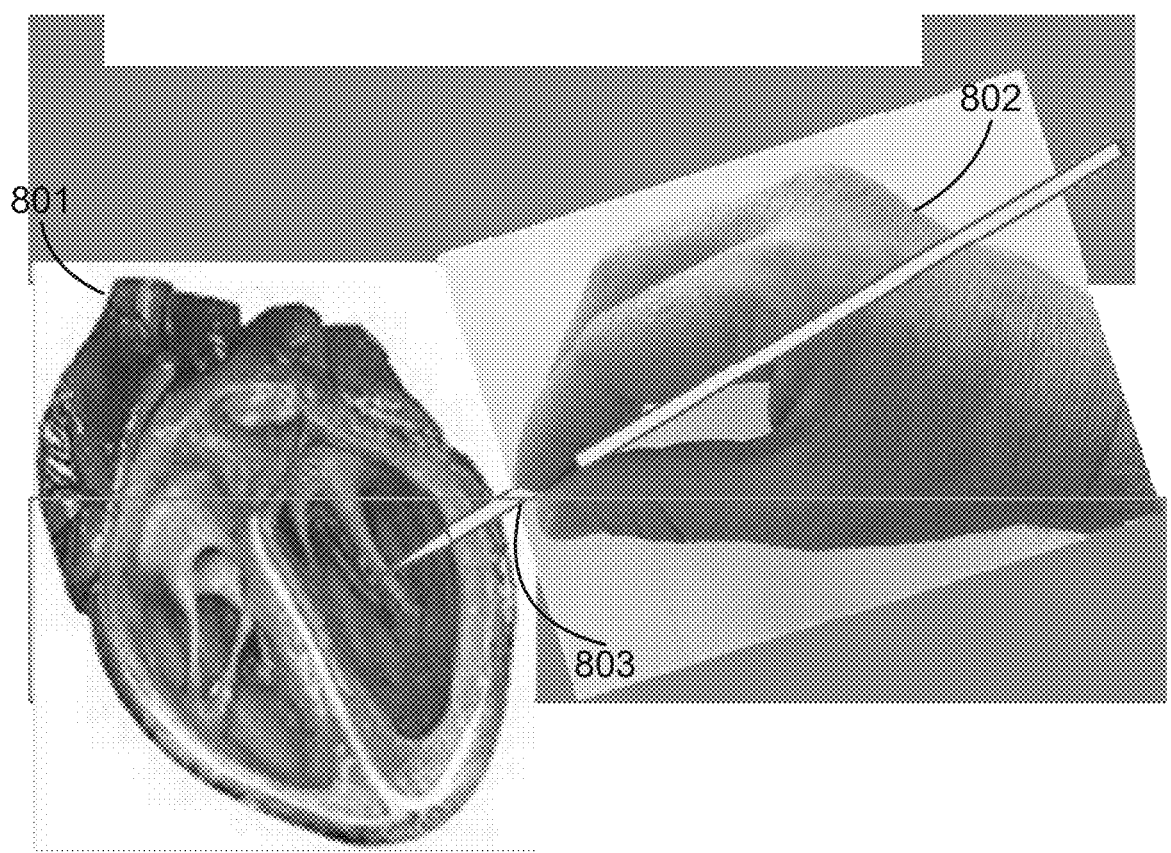

Reference is now made to FIGS. 7A, 7B and 7C which are simplified illustrations of a user's hand interacting with an image of a virtual object, according to an example embodiment of the invention.

FIG. 7A displays an image of a virtual object 801, in this case a heart, and a user's hand 802 approaching a vicinity of the image of the virtual object 801. The user sees both the hand 802, which is a real object, and the image of the virtual object 801.

In some embodiments the user's hand performs a gesture, optionally such as shown in FIG. 7A, of holding a tool or a pen or a pencil, so that a tracking unit can detect the gesture and optionally cause a display of the image of the virtual object to add a pen or a pencil (not shown in FIG. 7A) to the image. In some embodiments, the tool (not shown) is added to a location near the user's hand 802, optionally a location corresponding to where a pen or pencil would be if a real tool or pen or pencil were held in the user's hand 802.

In some embodiments the display adds a tool/pen/pencil/ stylus when provided a user interface commands by a conventional tool, such as a mouse, a voice command, and other similar commands.

FIG. 7B displays the image of the virtual object 801, the user's hand 802, and a tool/pen/pencil 803 apparently in the user's hand 802. The user sees both the hand 802, which is a real object, and the image of the virtual object 801, and the image of the toll/pen/pencil 803.

In some embodiments, such as shown in FIG. 7B, the tool/pen/pencil 803 is displayed prior to the user closing his fingers on each other, for example in response to a user interface command such as the above-mentioned gesture, or to a conventional user interface command.

In some embodiments, not as shown in FIG. 7B, the tool/pen/pencil 803 is not displayed until the user performs a grabbing action at a vicinity of the virtual object 801, for example the tool/pen/pencil 803 is not shown until the user touches a finger to a thumb.

FIG. 7C displays the image of the virtual object 801, the user's hand 802, and the tool/pen/pencil 803 apparently in the user's hand 802. The user sees both the hand 802, which is a real object, and the image of the virtual object 801, and the image of the tool/pen/pencil 803. The user feels one finger touching the other, providing a tactile sense of touching or grabbing the tool/pen/pencil 803.

In some embodiments, when the used touches his fingers to each other and achieves a tactile sense of holding on to the tool/pen/pencil 803, the system enters a user interface mode where movements performed by the user's hand 802 are translated to manipulations of the tool/pen/pencil 803, and the tool/pen/pencil 803 optionally performs actions upon the virtual object 801 as if it were a real tool/pen/pencil 803.

By way of a non-limiting example, the tool/pen/pencil 803 may optionally be an image of a scalpel, and the virtual object 801, the heart, may be manipulated to appear as if dissected by manipulating an actual scalpel. In such a case the image of the scalpel is manipulated to move according to movements of the hand apparently holding the image of the scalpel, and the image of the heart is manipulated according to movements of the scalpel and optionally displaying a model of what an incision of the heart at a location of the scalpel blade should look like.

Reference is now made to FIGS. 8A, 8B, 8C and 8D, which are simplified illustrations of a user interacting with an image of a virtual object, according to an example embodiment of the invention.

Figure 8A:
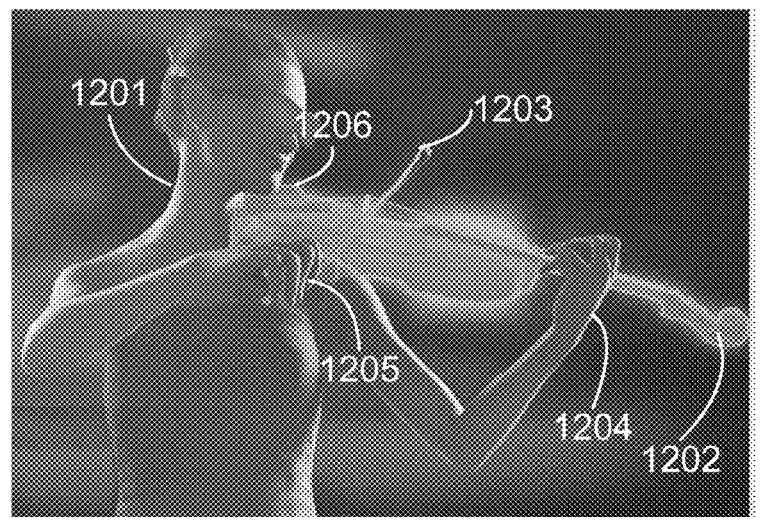
FIGS. 8A, 8B, 8C and 8D are simplified illustrations of a user interacting with an image of a virtual object, according to an example embodiment of the invention.

FIG. 8A depicts a user 1201 holding on to a virtual violin 1202 and a virtual bow 1203.

The user 1201 optionally touches fingers of her left hand 1204 to a palm of her left hand 1204, thereby sensing her fingers touching something. A display (not shown) displays the virtual violin 1202 neck held by the user's left hand 1204.

In some embodiments, the user 1201, after apparently grasping the neck of the virtual violin 1202 somewhere within a viewing space appropriate to the display, made a movement appropriate for bringing the virtual violin 1202 up to her shoulder, resting the virtual violin 1202 on her shoulder, and lowering her chin onto a chin rest of the virtual violin 1202. When the user 1201 lowered her chin onto the chin rest of the virtual violin 1202, thereby reaching a specific distance from her shoulder, the display optionally displays the virtual violin 1202 as held by the user's 1201 chin-to-shoulder gap.

The user 1201 optionally touches fingers of her right hand 1205 to a thumb of her right hand 1205, thereby sensing her fingers touching something. The display (not shown) displays the virtual bow 1203 held by the user's right hand 1203.

In some embodiments the user 1201 optionally makes violin playing motions with her left and/or right hand(s), and the display displays the virtual violin 1202 as held by the user's 1201 left hand and/or her chin, and the virtual bow 1203 as held by the user's 1201 right hand.

Figure 8B:
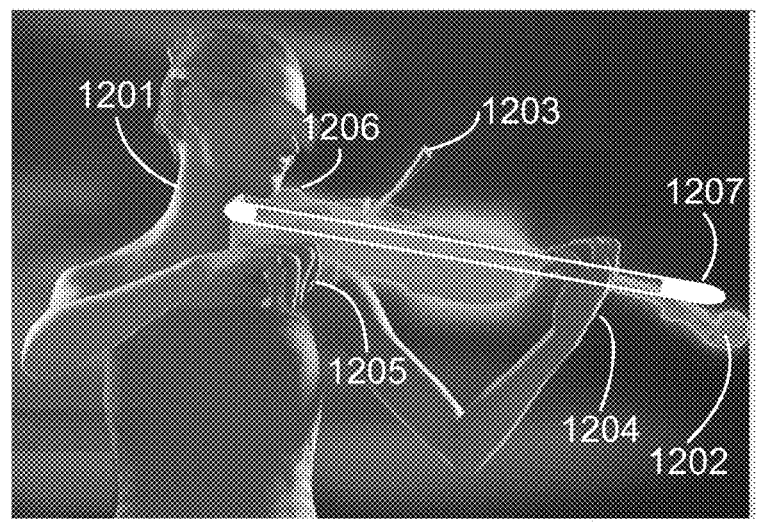

FIG. 8B depicts a user 1201 holding on to a virtual violin 1202 and a virtual bow 1203, and also onto a real object—a stick 1207.

The user 1201 optionally touches fingers of her left hand 1204 to the stick 1207, thereby sensing her fingers touching something. A display (not shown) overlays an image of a virtual object, the virtual violin 1202, onto the real stick 1207, showing the virtual violin 1202 neck as if held by the user's left hand 1204.

In some embodiments, the user 1201, after grasping the real stick 1207 somewhere within a viewing space appropriate to the display, made a movement appropriate for bringing the virtual violin 1202 up to her shoulder, and the display displays the virtual violin 1202 overlaid on the location of the real stick 1207 and moves the display of the virtual violin 1202 up to the user's 1201 shoulder. The user 1201 optionally lowers her chin toward the image of the chin rest of the virtual violin 1202. When the user 1201 lowers her chin onto the chin rest of the virtual violin 1202, thereby reaching a specific distance from her shoulder, the display optionally displays the virtual violin 1202 as held by the user's 1201 chin-to-shoulder gap.

The user 1201 optionally touches fingers of her right hand 1205 to a thumb of her right hand 1205, thereby sensing her fingers touching something. The display (not shown) displays the virtual bow 1203 held by the user's right hand 1203.

In some embodiments the user 1201 optionally makes violin playing motions with her left and/or right hand(s), and the display displays the virtual violin 1202 as held by the user's 1201 left hand and/or her chin, and the virtual bow 1203 as held by the user's 1201 right hand.

Figure 8C:
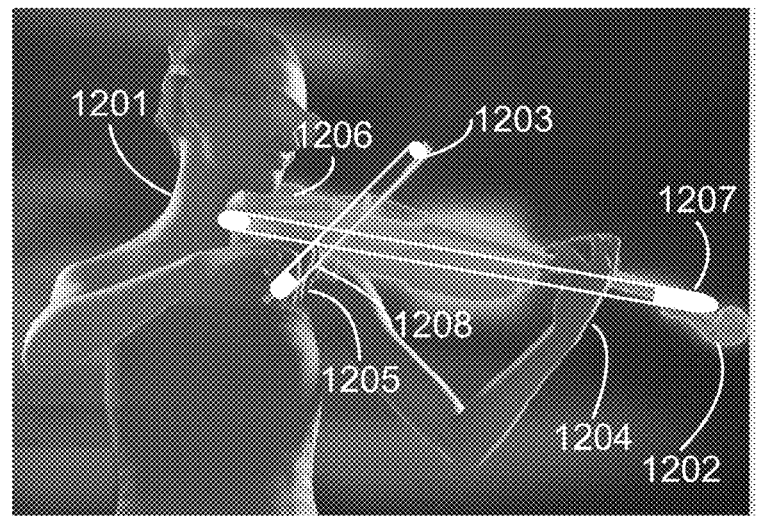

FIG. 8C depicts a user 1201 holding on to a virtual violin 1202 and a virtual bow 1203, and also onto two real objects—a first stick 1207 and a second stick 1208.

The user 1201 optionally touches fingers of her left hand 1204 to the first stick 1207, thereby sensing her fingers touching something. A display (not shown) overlays an image of a virtual object, the virtual violin 1202, onto the real stick 1207, showing the virtual violin 1202 neck as if held by the user's left hand 1204.

The user 1201 optionally touches fingers of her right hand 1205 to the second stick 1208, thereby sensing her fingers touching something, and the display overlays the image of the virtual bow 1203 onto the real second stick 1208. The display displays the virtual bow 1203 held by the user's right hand 1203.

In some embodiments the user 1201 optionally makes violin playing motions with her left and/or right hand(s), and the display displays the virtual violin 1202 as held by the user's 1201 left hand and/or her chin, and the virtual bow 1203 as held by the user's 1201 right hand.

In some embodiments the user 1201 actually scrapes the second stick 1208 along the first stick 1207, and the display displays the virtual bow 1203 scraping the virtual violin's 1202 strings.

Figure 8D:
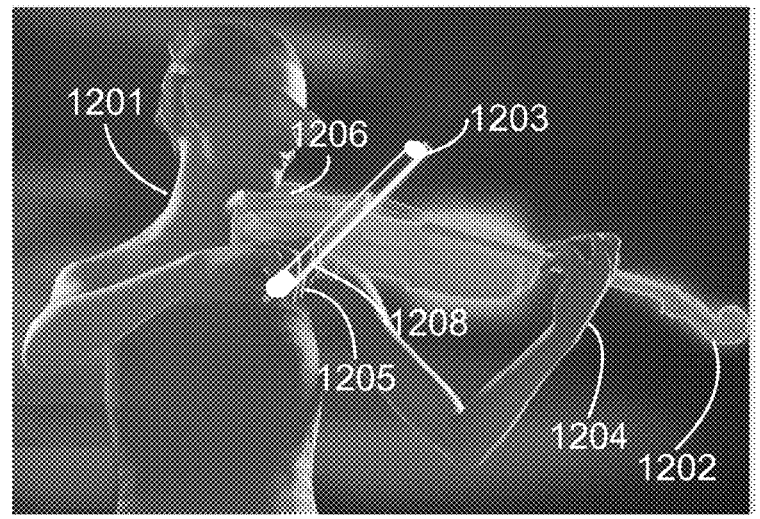

FIG. 8D depicts a user 1201 holding on to a virtual violin 1202 and a virtual bow 1203, and also onto one real object—a second stick 1208.

The user 1201 optionally touches fingers of her left hand 1204 to a palm of her left hand 1204, thereby sensing her fingers touching something. A display (not shown) displays the virtual violin 1202 neck held by the user's left hand 1204.

In some embodiments, the user 1201, after apparently grasping the neck of the virtual violin 1202 somewhere within a viewing space appropriate to the display, made a movement appropriate for bringing the virtual violin 1202 up to her shoulder, resting the virtual violin 1202 on her shoulder, and lowering her chin onto a chin rest of the virtual violin 1202. When the user 1201 lowered her chin onto the chin rest of the virtual violin 1202, thereby reaching a specific distance from her shoulder, the display optionally displays the virtual violin 1202 as held by the user's 1201 chin-to-shoulder gap.

The user 1201 optionally touches fingers of her right hand 1205 to the second stick 1208, thereby sensing her fingers touching something, and the display overlays the image of the virtual bow 1203 onto the real second stick 1208. The display displays the virtual bow 1203 held by the user's right hand 1203.

In some embodiments the user 1201 optionally makes violin playing motions with her left and/or right hand(s), and the display displays the virtual violin 1202 as held by the user's 1201 left hand and/or her chin, and the virtual bow 1203 as held by the user's 1201 right hand.

Figure 9A:
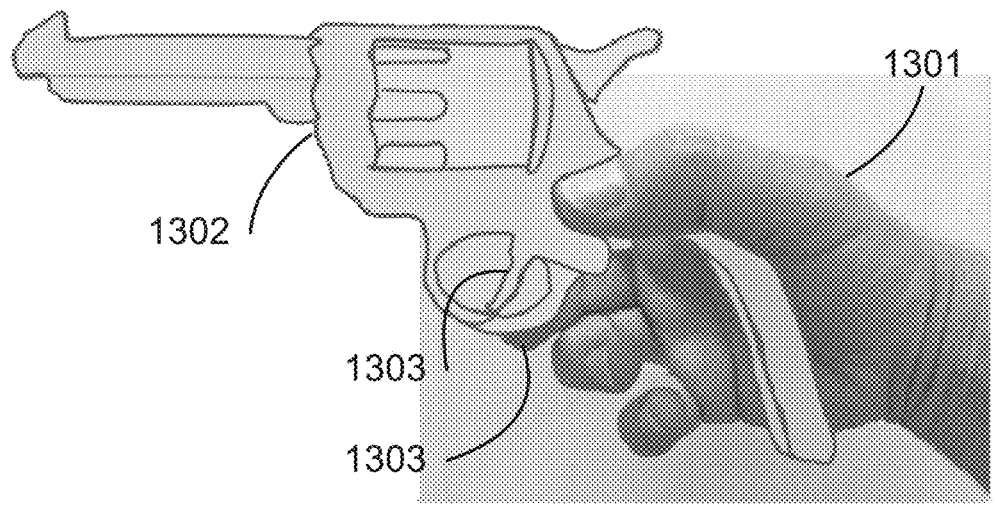
FIGS. 9A and 9B are simplified illustrations of a user's hand interacting with an image of a virtual object, according to an example embodiment of the invention.
Figure 9B:
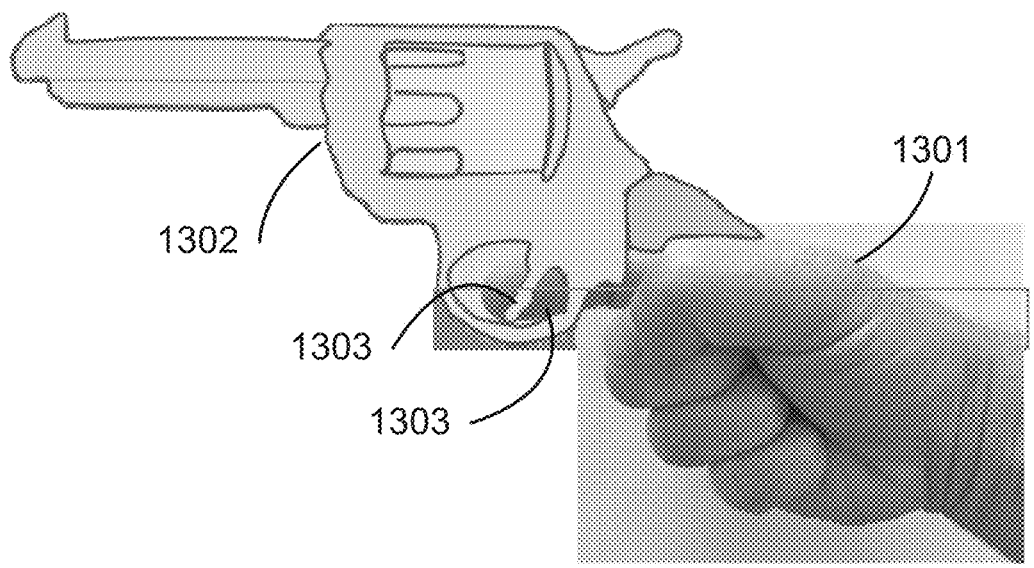

Reference is now made to FIGS. 9A and 9B which are simplified illustrations of a user's hand interacting with an image of a virtual object, according to an example embodiment of the invention.

FIG. 9A shows a hand 1301 within a volume of space monitored by a touch detector. The monitored volume of space overlaps a viewing space in which an image 1302 of a virtual object is displayed. In FIGS. 9A and 9B the image of the virtual object is an image of a revolver. In some embodiments images of other virtual objects may be displayed, for example of virtual objects with grips, such as an electric drill, a water hose and so on.

FIG. 9B shows the hand 1301 with at least some of the fingers of the hand 1301 touching the palm of the hand 1301. In some embodiments the touching is detected, and the image 1302 of the virtual object is then displayed as if held by the hand 1301.

In some embodiments, a touch detector (not shown) may optionally track fingers of the hand, and when a finger 1304 of the hand 1301 is at a location of an image 1303 of a part of the virtual object 1302, such as a trigger of the revolver, the display may optionally display as if the trigger is actuated.

In some embodiments (not shown) the touch detector may optionally detect the hand 1301 touching a holster and/or a location where an imaginary holster may be, such as a belt or a thigh, and detecting the touch may provide input to a display system to display an image of a virtual object, such as a revolver, to appear. The image of a virtual object, such as the revolver, may appear floating in the viewing space in a vicinity of the location touched, waiting to be gripped by performing an additional touch of the fingers to the palm, or may appear already gripped by the hand 1301.

In some embodiments the touch sensation is used in a CAD user interface. By way of a non-limiting example, a CAD designer optionally touches a real object within a display volume with his/her fingers, and such touching is detected. A location of the touching relative to the real object is optionally used to mark locations on the real object and/or draw shapes on the real object. Such markings optionally marl locations which are optionally used for performing CAD functions at the marked locations. Some non-limiting examples of CAD functions which may follow such markings include an extrude function.

The touching on the real object is detected by a touch detector, and to the CAD designer feels naturally consistent with the visual sensation.

By way of a non-limiting example: architects working on designing an additional floor for a building, optionally drawing on a real model of the building and the extruding/cutting of the marked shape is optionally displayed as a virtual image by the display. The touching sensation matches the visual perception.

In some embodiments the touch sensation is used in a visual interactive application.

By way of a non-limiting example, a user optionally brings a hand to a display image of a virtual pile of salt. The user optionally pinches his fingers at a location of the salt. The display shows the salt as being held by the pinched fingers. When the user optionally moves his hand toward an image of a virtual person and opens his hand, the display optionally shows the salt flying toward the image of the virtual person, and optionally shows the virtual person's eyes watering.

Figure 10A:
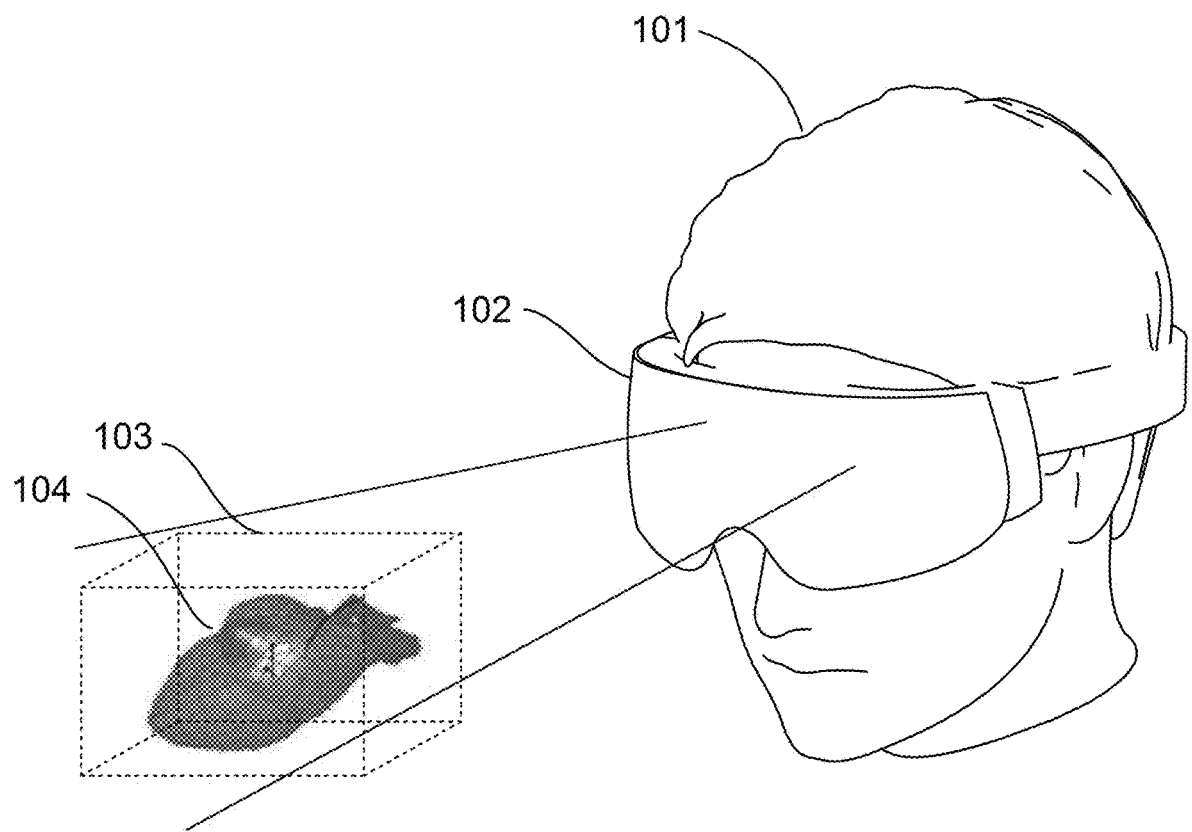
FIGS. 10A and 10B are simplified line drawing illustrations of floating-in-the-air display systems for showing a virtual object in a viewing space according to an example embodiment of the invention.
Figure 10B:
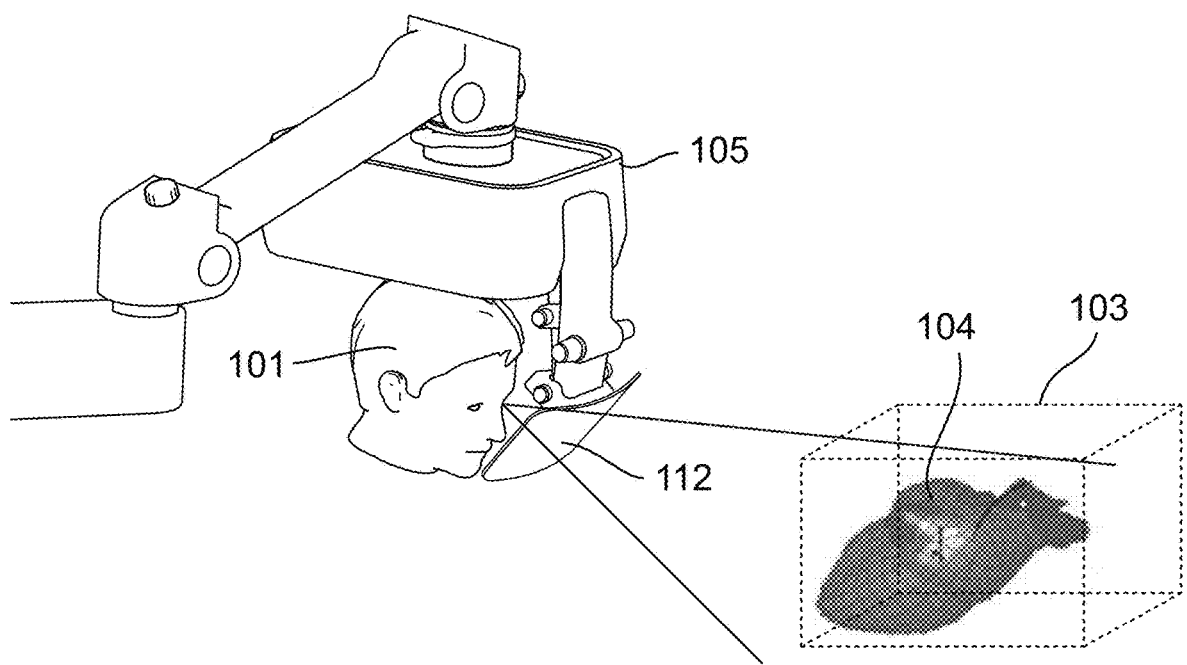

Reference is now made to FIGS. 10A and 10B, which are simplified line drawing illustrations of floating-in-the-air display systems for showing a virtual object in a viewing space according to an example embodiment of the invention.

FIG. 10A depicts a head mounted display (HMD) 102 as an example of a floating-in-the-air display system for displaying a virtual object 104, in a viewing space 103. FIG. 10A depicts a user 101 viewing the virtual object 104, which in the case of FIG. 10A is an image of a heart. In some embodiments the display 102 is a holographic display for displaying three-dimensional holographic images.

FIG. 10B depicts a display 112 on an adjustable arm system 105 as an example of a floating-in-the-air display system for displaying a virtual object 104, in a viewing space 103. FIG. 10B depicts a user 101 viewing the virtual object 104, which in the case of FIG. 10B is an image of a heart. In some embodiments the display 112 is a holographic display for displaying three-dimensional holographic images.

Reference is now made to FIG. 11, which is a simplified illustration of users 301*a* 301*b* 301*c* using a floating-in-the-air display system 310 for showing virtual objects 304*a* 304*b* according to an example embodiment of the invention.

The floating-in-the-air display system 310 components are spread among various packages: head mounted displays 302*a*, 302*b*, 302*c*; one or more touch detection or tracking unit(s) 307, and one or more computing unit(s) 311.

FIG. 11 is intended to show that an extent of the viewing space (not marked in FIG. 11) may be as large as a room, and even larger; an extent of a space tracked by the tracking component may be as large as a room and even larger. FIG. 11 also shows that components of such a system, namely one or more display(s) 302a 302b 302c; one or more tracking unit(s) 307; and one or more computing unit(s) 311 may be distributed or packaged compactly in one package.

In some embodiments some users may be displayed one of the users manipulating an image of a virtual object by holding on to the virtual object as described herein. In some embodiments one or more handles may be displayed only to a user performing the holding onto the images of the virtual objects, and in some embodiments the images of the handles may be displayed to more users.

FIG. 11 is also intended to show that users 302a 302b 302c may touch each other's hands or bodies and the tracking unit(s) 307 optionally detects the touching.

In some embodiments a first user 301a may touch a hand of a second user 301b at a location of a virtual object 304b. The users 301a 301b feel a sense of touch, and the displays 302a 302b optionally show manipulations of the image of the virtual object 304b according to movements of the touching hands of the users 301a 301b. In some embodiments the displays 302a 302b optionally cease showing a manipulation of an image of a virtual object 304b when the hands of the users stop touching. In some embodiments the display may optionally show the image of the virtual object 304b dropping to the floor.

Figure 12:
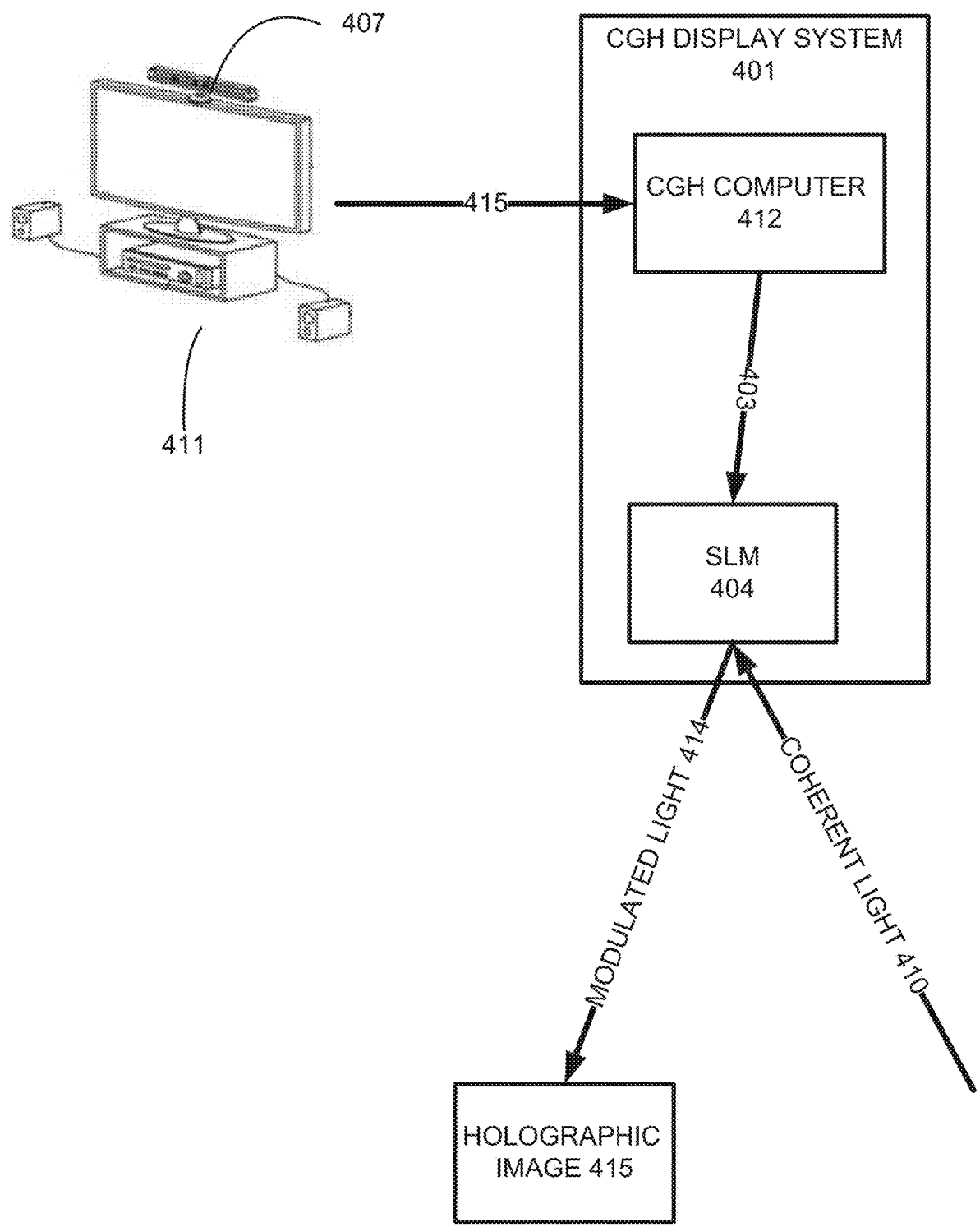
FIG. 12 is a simplified block diagram illustration of a floating-in-the-air display system for showing virtual holographic objects according to an example embodiment of the invention.

Reference is now made to FIG. 12, which is a simplified block diagram illustration of a floating-in-the-air display system for showing virtual holographic objects according to an example embodiment of the invention.

A tracking component 407 optionally tracks real objects in a viewing space (not shown), and provides locations of the real objects to a computing unit 411. The computing unit 411 optionally detects when a touch instance occurs, such as a user's finger or hand touching an object in the viewing space, and provides data 415 for producing a computer generated holographic (CGH) image to a CGH computer 412 in a CGH display system 401. The CGH computer optionally provides pixel value data 403 to a spatial light modulator (SLM) 404. When coherent light 410 illuminates the SLM 404, modulated light 414 is produced, which a viewer (not shown) views as a holographic image 415.

FIG. 12 shows a specific embodiment of the system for providing tactile feedback in a floating-in-the-air display system with reference to a CGH display system.

Figure 13:
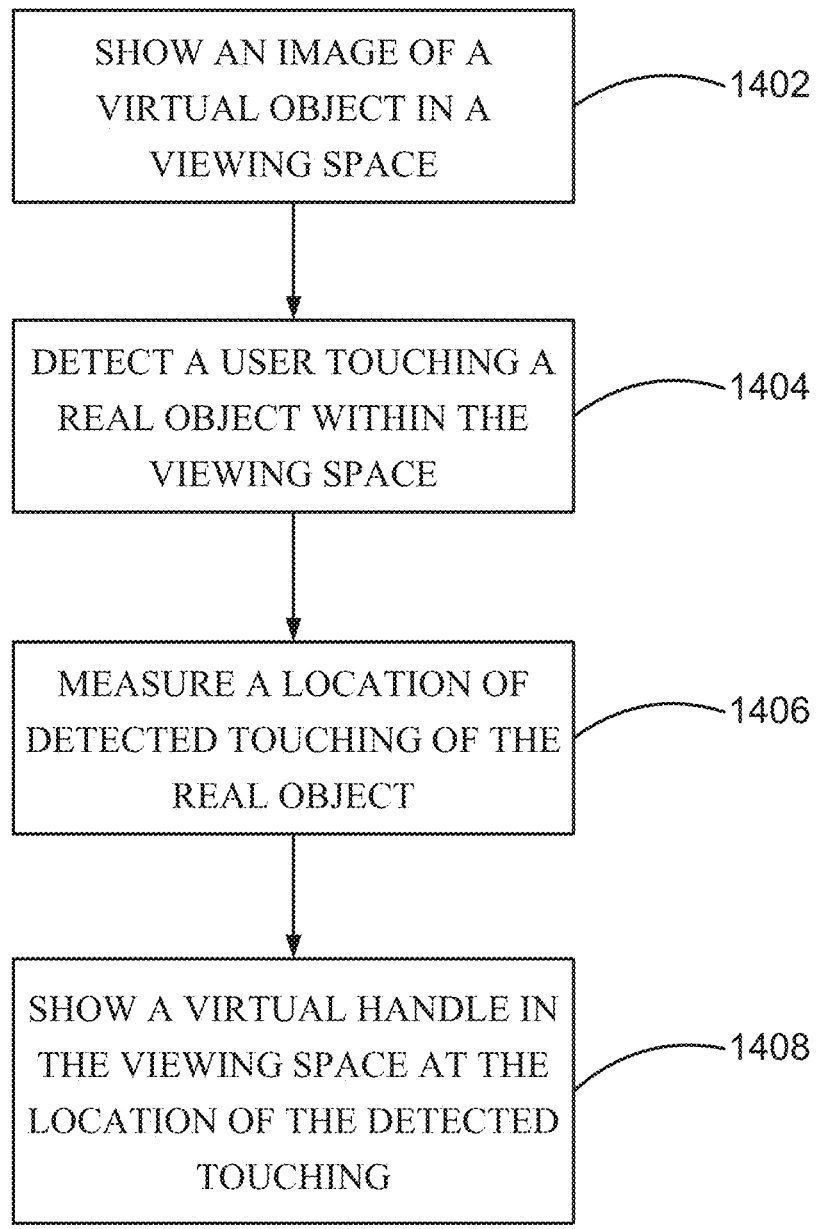
FIG. 13 is a simplified flow chart diagram illustration of a method for providing tactile feedback in a display system according to an example embodiment of the invention.

Reference is now made to FIG. 13, which is a simplified flow chart diagram illustration of a method for providing tactile feedback in a display system according to an example embodiment of the invention.

The method of FIG. 13 includes:
using a display to show an image of a virtual object in a viewing space (1402);
using a touch detector to detect a user touching a real object within the viewing space (1404);
measuring a location of detected touching of the real object (1406); and
showing a virtual handle in the viewing space at the location of the detected touching (1408).

Figure 14:
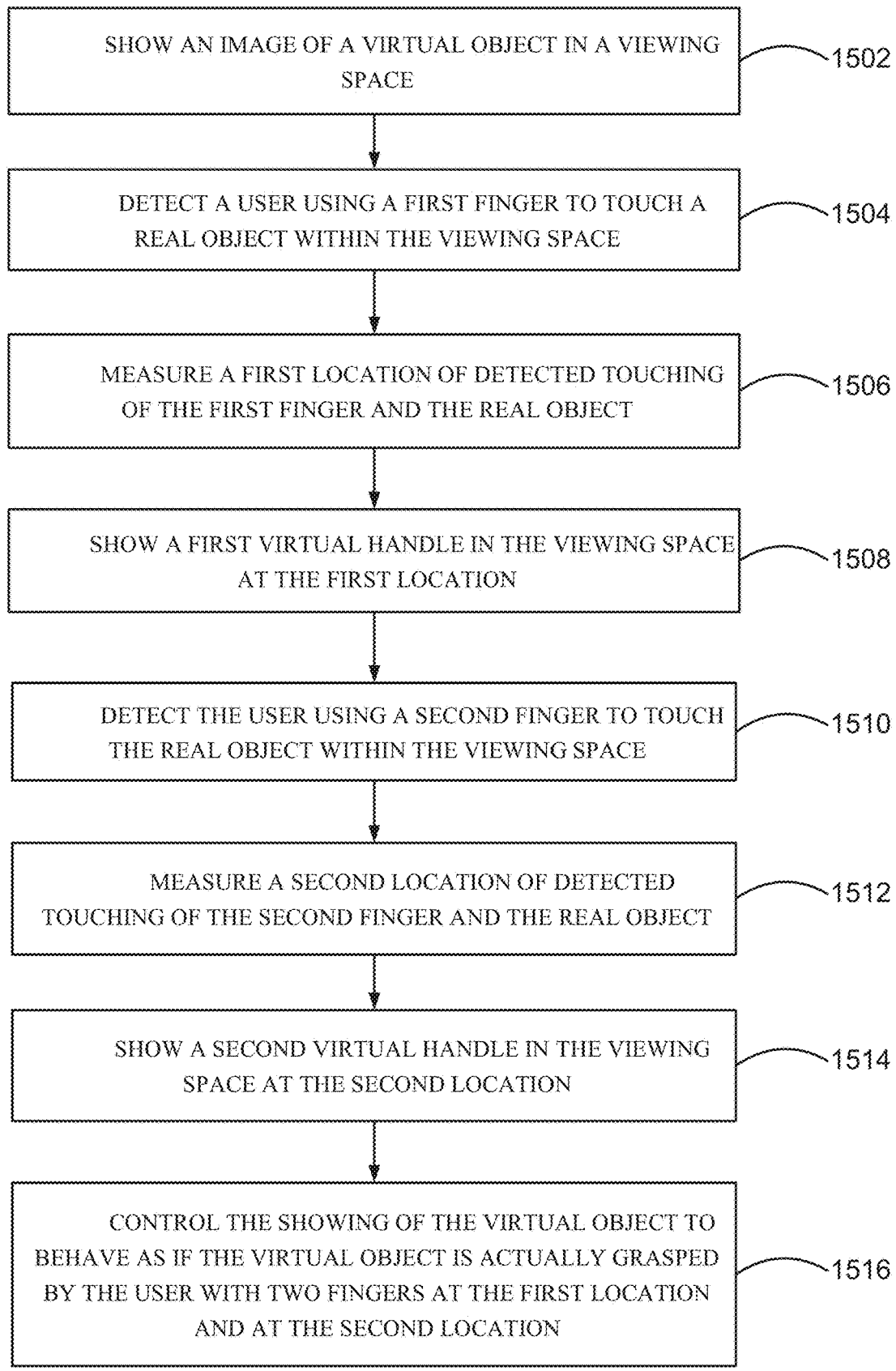
FIG. 14 is a simplified flow chart diagram illustration of a method for providing tactile feedback in a display system according to an example embodiment of the invention.

Reference is now made to FIG. 14, which is a simplified flow chart diagram illustration of a method for providing tactile feedback in a display system according to an example embodiment of the invention.

The method of FIG. 14 includes:
using a display to show an image of a virtual object in a viewing space (1502);
using a touch detector to detect a user using a first finger to touch a real object within the viewing space (1504);
measuring a first location of detected touching of the first finger and the real object (1506);
showing a first virtual handle in the viewing space at the first location (1508);
using a touch detector to detect the user using a second finger to touch the real object within the viewing space (1510);
measuring a second location of detected touching of the second finger and the real object (1512);
showing a second virtual handle in the viewing space at the second location (1514); and
controlling the showing of the virtual object to behave as if the virtual object is actually grasped by the user with two fingers at the first location and at the second location (1516).

In some embodiments, controlling the showing of the virtual object to behave as if the virtual object is actually grasped by the user with two hands includes performing user interface actions such as zooming in, zooming out, rotating, bending, and deforming in response to movement of the two fingers relative to each other.

Figure 15:
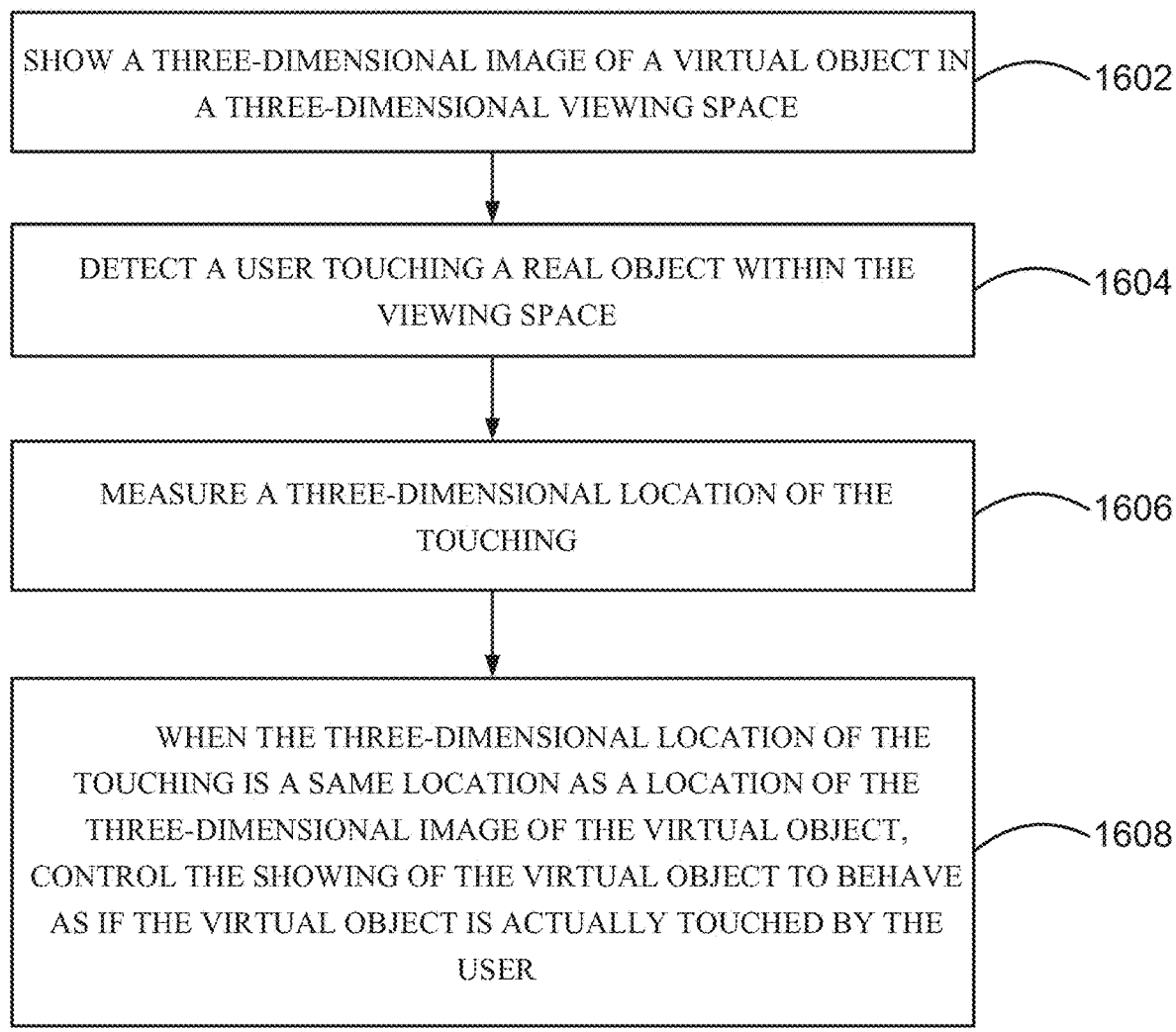
FIG. 15 is a simplified flow chart diagram illustration of a method for providing tactile feedback in a display system according to an example embodiment of the invention.

Reference is now made to FIG. 15, which is a simplified flow chart diagram illustration of a method for providing tactile feedback in a display system according to an example embodiment of the invention.

The method of FIG. 15 includes:
using a display to show a three-dimensional image of a virtual object in a three-dimensional viewing space (1602);
using a touch detector to detect a user touching a real object within the viewing space (1604);
measuring a three-dimensional location of the touching (1606); and
when the three-dimensional location of the touching is a same location as a location of the three-dimensional image of the virtual object, controlling the showing of the virtual object to behave as if the virtual object is actually touched by the user (1606).

It is expected that during the life of a patent maturing from this application many relevant virtual object displays will be developed and the scope of the term virtual object displays is intended to include all such new technologies a priori.

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for providing a tactile sensation and a corresponding visual display to a user of a display system comprising:
    using a display to show a user an image of a virtual object in a viewing space;
    using a touch detector to detect the user touching a real object within the viewing space; and
    providing a location of the touching to the display,
    wherein the display is a three-dimensional display and detecting the user touching the real object within the viewing space comprises detecting that the user touched the real object at a same location, in three dimensions, as the image of the virtual object appears to the user; and,
    based on the touch detector detecting that:
        the user touched the real object
        at the location of the virtual object,
    controlling the showing of the virtual object to behave as if the virtual object is actually manipulated by the user at the location,
    thereby providing the user with a tactile sensation at the location, and a corresponding visual display of the virtual object as if actually manipulated by the user.

2. The method of claim 1, wherein the real object comprises a real object selected from a group consisting of:
    a finger of the user's hand;
    a portion of the user's hand;
    a portion of the user's body; and
    a real object other than a part of the user's body.

3. The method of claim 1, wherein the showing the image of the virtual object further comprises showing a first virtual handle appearing in the viewing space.

4. The method of claim 3, wherein the showing the first virtual handle comprises showing the first virtual handle in the viewing space at the location of the detected touching.

5. The method of claim 4, and further comprising:
    using the touch detector to detect the user using a second finger to touch the real object within the viewing space;
    measuring a second location of detected touching of the second finger and the real object;
    showing a second virtual handle in the viewing space at the second location; and
    controlling the showing of the virtual object to behave as if the virtual object is actually grasped by the user with two fingers at the first location and at the second location.

6. The method of claim 5, and further comprising controlling the showing of the virtual object to perform a user interface action selected from a group consisting of:
    zooming in;
    zooming out;
    rotating;
    bending; and
    deforming
    in response to movement of the two fingers relative to each other.

7. The method of claim 3, wherein the virtual handle appears as if attached to the virtual object.

8. The method of claim 3, wherein a shape of the virtual handle is a shape selected from a group consisting of:
    a line;
    a straight line;
    a two-dimensional surface;
    a flat two-dimensional surface;
    a three-dimensional body.

9. The method of claim 3, wherein the showing of the virtual object controls the showing the virtual object to appear to rotate around an axis of the virtual handle when the user:
    touches the real object; and
    rotates the user's hand around the axis of the virtual handle.

10. The method of claim 1, wherein the showing an image of a virtual object comprises showing by a head mounted display, and wherein the detecting a user touching a real object within the viewing space is performed, at least in part, by a component in the head mounted display.

11. The method of claim 1, wherein the showing an image of a virtual object comprises showing a holographic image of the virtual object.

12. The method of claim 1, wherein the showing an image of a virtual object comprises showing a stereoscopic image of the virtual object.

13. The method of claim 1, and further comprising:
the touch detector detecting that the user's hand is not touching the real object; and
the touch detector providing an indication that the user's hand is not touching to the display,
and further comprising the display controlling the showing the virtual object to behave as if the virtual object is not held by the user's hand.

14. The method of claim 1, and further comprising:
inserting the real object, other than the user's hand, into the viewing space;
detecting a location of the real object;
overlaying an image of the virtual object onto the real object;
using the touch detector to detect the user touching the real object; and
manipulating showing the image of the virtual object corresponding to the user manipulating the real object.

15. A floating-in-the-air display system for providing a user with tactile sense and visual display of apparently touching a virtual object shown by the system, comprising:
a display component for showing a user a virtual object in a viewing space; and
a touch detector for:
detecting the user touching a real object within the viewing space;
measuring a location of detected touching of the real object; and
providing the location to the display component,
wherein the touch detector is configured to detect the user touching at least one finger to the real object; and,
based on the touch detector detecting that:
the user touched the real object
at the location of the virtual object,
controlling the showing of the virtual object to behave as if the virtual object is actually manipulated by the user at the location,
thereby providing the user with a tactile sensation at the location, and a corresponding visual display of the virtual object as if actually manipulated by the user.

16. The system of claim 15, wherein the real object comprises a real object selected from a group consisting of:
a finger of the user's hand;
a portion of the user's hand;
a portion of the user's body; and
a real object other than a part of the user's body.

17. The system of claim 15, and further comprising the display configured to show at least one virtual handle in the viewing space.

18. The system of claim 17 wherein the display is configured to show the at least one virtual handle as if attached to the virtual object.

19. The system of claim 15, wherein the touch detector comprises a camera.

20. The system of claim 15, wherein the touch detector comprises a glove.

21. The system of claim 15, wherein the display component comprises a head mounted display, and wherein the touch detection component is comprised in the head mounted display.

22. The system of claim 15, wherein the display component comprises a holographic image display.

23. The system of claim 15, wherein the display component comprises a stereoscopic image display.

24. The system of claim 15, and further comprising:
the touch detector being configured to:
detect a location of a second real object, other than the user's hand, inserted into the viewing space; and
provide a location of the second real object to the display component; and
the display being configured to:
overlay an image of the virtual object onto the second real object, and
the touch detector being configured to detect the user touching the second real object and provide a location of the detected touching of the second real object to the display component, and
the display component being configured to control showing of the virtual object corresponding to the user manipulating the real object.

* * * * *